(12) United States Patent
Bulmahn et al.

(10) Patent No.: US 12,310,282 B2
(45) Date of Patent: May 27, 2025

(54) METERING SYSTEM OF AN AGRICULTURAL MACHINE

(71) Applicant: Amazonen-Werke H. Dreyer SE & Co. KG, Hasbergen (DE)

(72) Inventors: Simon Bulmahn, Westerstede (DE); Hendrik Claussen, Hatten (DE)

(73) Assignee: Amazonen-Werke H.Dreyer SE & Co., KG, Hasbergen (DE)

(*) Notice: Subject to any disclaimer, the term of this patent is extended or adjusted under 35 U.S.C. 154(b) by 619 days.

(21) Appl. No.: 17/632,759

(22) PCT Filed: May 28, 2020

(86) PCT No.: PCT/EP2020/064828
§ 371 (c)(1),
(2) Date: Feb. 3, 2022

(87) PCT Pub. No.: WO2021/023409
PCT Pub. Date: Feb. 11, 2021

(65) Prior Publication Data
US 2022/0287224 A1  Sep. 15, 2022

(30) Foreign Application Priority Data
Aug. 6, 2019 (DE) ...................... 10 2019 121 150.6

(51) Int. Cl.
*A01C 7/10* (2006.01)
*A01C 7/04* (2006.01)
*A01C 21/00* (2006.01)

(52) U.S. Cl.
CPC ............ *A01C 7/102* (2013.01); *A01C 7/0443* (2023.05); *A01C 21/005* (2013.01); *A01C 7/046* (2013.01)

(58) Field of Classification Search
CPC ......... A01C 7/046; A01C 7/04; A01C 7/0445; A01C 7/0443; A01C 7/044; A01C 21/005
See application file for complete search history.

(56) References Cited

U.S. PATENT DOCUMENTS

| | | | |
|---|---|---|---|
| 4,450,979 A * | 5/1984 | Deckler | A01C 7/046 222/352 |
| 8,942,894 B2 * | 1/2015 | Garner | A01C 21/005 701/50 |

(Continued)

FOREIGN PATENT DOCUMENTS

| | | |
|---|---|---|
| EP | 0216057 B1 | 4/1990 |
| EP | 1637026 A1 | 3/2006 |
| WO | 2012140349 A1 | 10/2012 |

OTHER PUBLICATIONS

International Preliminary Report on Patentability for International Application No. PCT/EP2020/064828 dated Feb. 8, 2022.

(Continued)

*Primary Examiner* — Jamie L McGowan
(74) *Attorney, Agent, or Firm* — Potomac Law Group, PLLC; John J. Penny, Jr.

(57) ABSTRACT

A metering system of an agricultural machine comprises a separating housing, a separating device arranged in the separating housing, an associated seed storage chamber disposed on the separating side of the separating device in the distributor housing, a storage container which is associated directly with the seed storage chamber of the separating housing, a partition wall which is arranged between the storage container and the seed storage chamber, at least one seed passage opening which is arranged in the partition wall and the passage size of which can be adjusted by at least one adjustable slide element by way of at least one adjustment element.

14 Claims, 26 Drawing Sheets

(56) References Cited

U.S. PATENT DOCUMENTS

Figure 1:
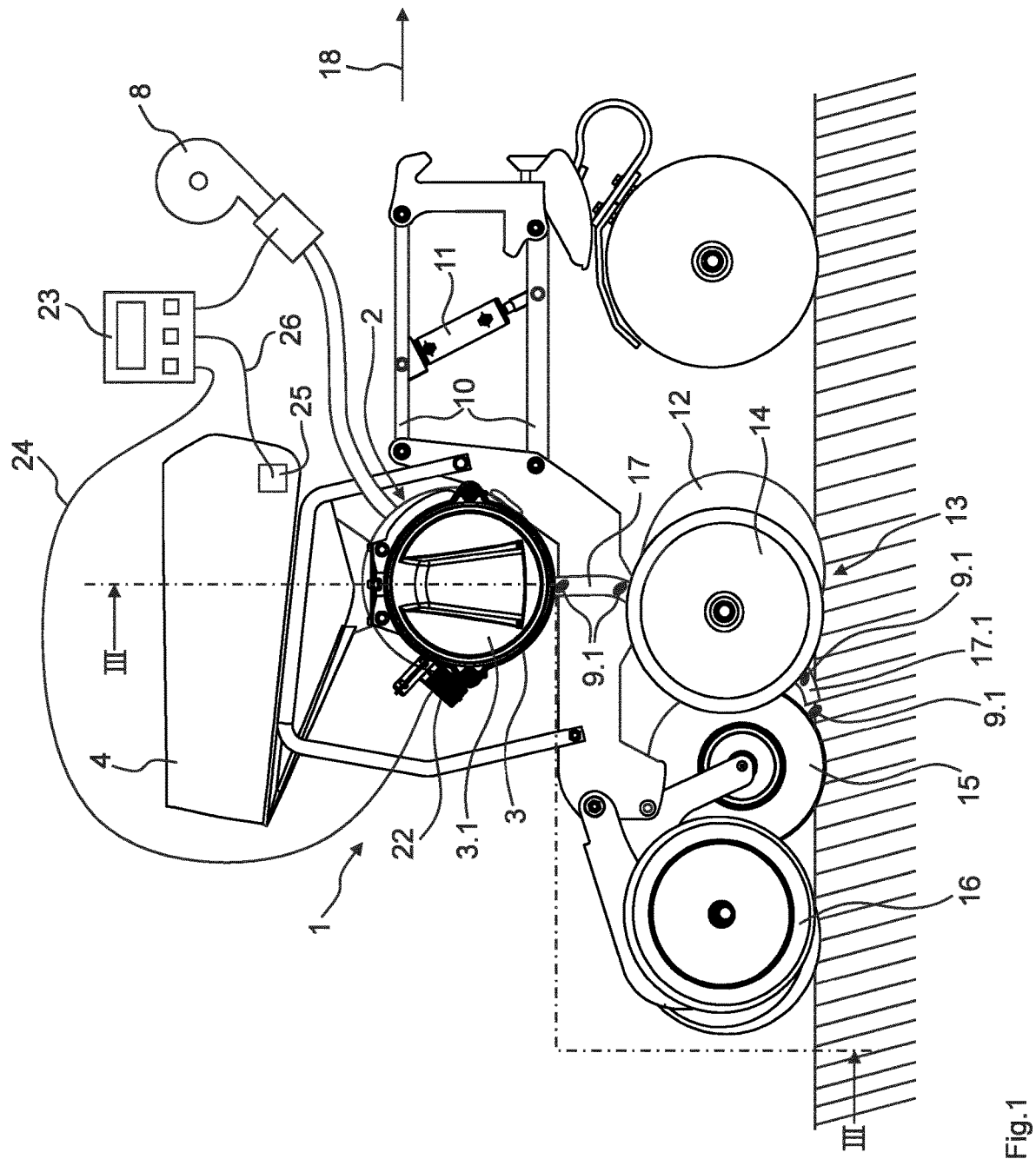

| | | | |
|---|---|---|---|
| 10,206,325 B2* | 2/2019 | Schoeny | A01C 7/046 |
| 2014/0165890 A1* | 6/2014 | Graham | A01C 7/107 |
| | | | 111/14 |
| 2015/0319916 A1* | 11/2015 | Garner | A01B 79/005 |
| | | | 111/171 |
| 2016/0143212 A1* | 5/2016 | Wendte | A01C 21/005 |
| | | | 111/183 |
| 2018/0000009 A1* | 1/2018 | Baitinger | A01C 7/046 |
| 2018/0220579 A1* | 8/2018 | Schoeny | A01C 21/005 |

OTHER PUBLICATIONS

International Search Report for International Application No. PCT/EP2020/064828 dated Aug. 26, 2020.
International Written Opinion for International Application No. PCT/EP2020/064828 dated Aug. 26, 2020.

* cited by examiner

METERING SYSTEM OF AN AGRICULTURAL MACHINE

REFERENCE TO RELATED APPLICATIONS

This application is a 35 U.S.C. 371 national stage filing of International Application No. PCT/EP2020/064828, filed on May 28, 2020, which claims priority to German Application DE 10 2019 121 150.6, filed on Aug. 6, 2019, the contents of which are hereby incorporated by reference.

The invention relates to a metering system for an agricultural machine according to the preamble of claim 1.

Such a metering system for an agricultural machine is described in German patent specification 1,137,889. This metering system of an agricultural machine configured as a single grain sowing machine comprises a separating housing. At least one separating device of the metering system is arranged in the separating housing. Disposed on the separating side of the separating device is an associated seed storage chamber in the distributor housing. A storage container is associated directly with the seed storage chamber of the separating housing. A partition wall is arranged between the storage container and the seed storage chamber. Arranged in the partition wall is at least one seed passage opening, the passage size of which can be adjusted by at least one adjustable slide element by way of at least one adjustment element.

In this known metering system, the slide element is adjusted by way of a manual adjustment device so that the passage opening can be adjusted manually therewith. As a result, the passage opening can be adjusted accordingly for adjusting the height of the grains in the seed storage chamber. At each metering system of a single grain sowing machine comprising a plurality of single grain sowing units, the respective slide element must be adjusted manually according to the type of seed to be spread. Manually adjusting a plurality of the same elements can be subject to incorrect operation and incorrect settings so that it is not always ensured that all slide elements are adjusted in the desired manner. In addition, it is not possible to perform any adjustments to the slide element during the spreading work, if the operating conditions require this, without interrupting the spreading process.

The invention is based on the object of creating an improved adjustment option for the slide element for adjusting the size of the passage opening between the storage container and the seed storage chamber, in particular also during the spreading work.

This object is satisfied according to the invention in that the at least one adjustment element of the adjustable slide element is configured as a motorized actuating element, that the motorized actuating element is connected to an electronic on-board computer by way of a data transmission device, in particular a data line, that data for adjusting the passage size of the passage opening determined by the slide position is saved and/or stored in at least one memory of the on-board computer and, accordingly, the motorized actuating element of the slide for adjusting the passage size of the passage opening can be actuated and/or is actuated.

As a result of these measures, the basic prerequisite is created for the gate valve for adjusting the passage size of the passage opening is adjusted and set in a manner adapted to the situation by way of the motorized actuating element from a remote location, for example, by the electronic on-board computer, so that automated adjustment is possible. When, for example, the type of seed to be spread is retrieved according to the data stored in the on-board computer, the size of the passage opening is adjusted in an automated manner by the slide to the type of seed to be spread. It is there possible that this adjustment is linked by way the on-board computer to the wiper setting and the corresponding data for this. The wiper for the separated spreading of the seed grains to be separated as well as the slide element for adjusting the passage size of the passage opening are set to their basic setting.

The wiper ensures that too many seed grains adhering to the separating openings of the separating device being subjected to a pressure difference are wiped off, so that only one seed grain adheres to each separating opening of the separating device being subjected to a pressure difference for being spread and deposited in the ground.

In order to ensure, firstly, that at least a sufficient quantity of seed grains is always supplied to the separating device and, secondly, that the filling level in the chamber between the partition wall and the separating side of the separating device is not too high, it is provided that the data saved and/or stored in the memory of the on-board computer for adjusting the passage size of the passage opening is at least dependencies between the passage size of the passage opening determined by the slide position, on the one hand, and, on the other hand, the type of seed, the spreading quantity, the filling level of seed in the chamber between the partition wall and the separating side of the separating device, and/or the slope inclination. This ensures that the slide is always set to a respective position adapted to the spreading conditions so that the passage size of the passage opening ensures in a situation-adapted manner an optimized supply of the seed to the separating device.

In order to automatically ensure a situation-adapted slide position for setting the situation-adapted passage size of the passage opening, it is provided that dependencies between the passage size of the passage opening determined by the slide position, on the one hand, and, on the other hand, the type of seed, the spreading quantity, and/or the slope inclination are saved and/or stored in at least one memory of the on-board computer, that, at least according to one of the dependencies, the motorized actuating element can be actuated and/or is actuated by the on-board computer for adjusting the passage size of the passage opening.

It is provided for a metering system with a separating device with at least one separating element driven to be rotatable with separating openings at which the seed grains to be separated and to be spread attach and subjected to a pressure difference applied via a pneumatic pressure generating device, where at least one wiper element arranged to be adjustable in the immediate vicinity of the separating openings is arranged to the separating element, that a motorized actuating element is associated with the adjustable wiper element, that the motorized actuating element is likewise connected to the electronic on-board computer by way of a data transmission device, in particular a data line, that data for adjusting the at least one wiper element is saved and/or stored in at least one memory of the on-board computer, and the motorized actuating element of the wiper element accordingly can be actuated or is actuated to adjust the latter.

As a result of these measures, the wiper element is adjusted according to the situations adapted to the spreading conditions such that too many seed grains adhering to the separating openings being subjected to a pressure difference are wiped off, so that one seed grain to be spread only always adheres to the separating openings subjected to a pressure difference for being deposited in the ground.

Adjusting the passage size of the passage opening in an automated manner and adjusting the wiper is achieved in that the data for adjusting the slide position of the slide element and for adjusting the wiper element are linked to one another, and that they can be actuated and/or are actuated in a corresponding manner at the appropriate point time according to the saved and/or stored data by way of the respectively associated motorized adjustment elements of the slide element and the wiper element.

In order to be able to enter respective specifications for adjusting the metering system according to the invention in the on-board computer, it is provided that the on-board computer comprises at least one input device, that, by way of this input device, the type of seed, the desired spreading quantity, in particular the number of seed grains to be spread per unit area or distance travelled, a respective, in particular the expected and/or actual slope inclination of the field to be cultivated an average slope inclination can be entered and/or is entered manually by way of the input device and/or by way of a sensor for determining the slope inclination and/or is transmitted via a data line.

In order to be able to optimally adjust the metering system such that uniform separation quality is ensured by the metering system regardless of the slope inclination, it is provided that at least one sensor for determining the slope inclination is associated with the metering system, that the data of the slope inclination determined by the sensor for determining the slope inclination can be transmitted and/or is transmitted via a data line to the on-board computer, that the actuating elements of the slide element and/or the wiper elements can be actuated and/or are actuated accordingly by the on-board computer based on the transmitted data of the slope inclination.

It is provided in a first application that, when travelling transverse to the slope, when the seed passage opening in the partition wall of the separating device is disposed on the upslope side with respect to the separating device, so that the seed storage chamber is disposed on the upslope side with respect to the separating device, the passage size of the seed passage opening is adjusted to be smaller by way of the on-board computer by appropriate actuation of the actuating element of the slide than when the seed passage opening in the partition wall is disposed on the downslope side with respect to the separating device, so that the seed storage chamber is disposed on the downslope with respect to the separating device.

It is provided in a further application that, when travelling transverse to the slope, when the seed passage opening in the partition wall of the separating device is disposed on the downslope side with respect to the separating device, so that the seed storage chamber is disposed on the downslope side with respect to the separating device, the passage size of the seed passage opening is adjusted to be smaller by way the on-board computer by appropriate actuation of the actuating element of the slide than when the seed passage opening in the partition wall is disposed on the upslope side with respect to the separating device, so that the seed storage chamber is disposed on the upslope side with respect to the separating device.

A further improvement in adjusting the metering system according to the invention can be achieved in that the passage size of the passage opening in the partition wall is adjusted during the spreading travel on level ground by way of the on-board computer by appropriate actuation of the actuating element of the slide to an intermediate size compared to the settings when traveling transverse to the slope, when the passage opening in the partition wall is disposed on the downslope side with respect to the separating device so that the seed storage chamber is disposed on the downslope side, or when the passage opening is disposed on the downslope side with respect to the separating device so that the seed storage chamber is disposed on the downslope side.

It is provided in another application that, when travelling downhill on a slope, the size of the passage opening in the partition wall is adjusted to be smaller by way of the on-board computer by appropriate actuation of the actuating element of the slide than when the agricultural machine is moving forward on an at least approximately horizontal surface. and that when travelling uphill on the slope, the passage size of the passage opening is adjusted to be larger by way of the on-board computer by appropriate actuation of the actuating element of the slide than when the agricultural machine is moving forward on an at least approximately horizontal surface.

In order to be able to determine and monitor the filling level of the chamber between the partition wall and the separating side of the separating device in a simple manner, so that the actual filling level can be detected in a simple manner and the passage size of the passage opening can therefore be adjusted adapted thereto and adapted accordingly, it is provided that a sensor for determining the filling level of seed is arranged in the chamber between the partition wall and the separating side of the separating device, that the sensor transmits data regarding this filling level of seed to the on-board computer and the motorized actuating element for adjusting the passage size of the seed passage opening in the partition wall is actuated accordingly in accordance with this data.

For an agricultural machine configured as a single grain sowing machine, which is composed of at least two side frames with metering systems arranged thereon that can be folded at a central part each by at least approximately 90° about an axis running in the direction of travel by way of a motorized folding system from a working position to a transport position, it is provided that devices for detecting the folding process and/or the initiation of the folding process are associated with the motorized folding system and, before or at the beginning of the folding process of the side frames with the metering systems arranged thereon, send signals from the transport position to the motorized actuating element of the slide so that the respective slide is moved to a position closing the seed passage opening in the partition wall. This ensures or warrants that, when folding the side frames in the transport position and metering systems of single grain sowing units disposed in the transport position, no additional seed grains can pass through the seed passage opening in the partition wall, which is closed by the slide element, into the seed storage chamber directly on the separating disk. The respective metering system of the single grain sowing unit is then ready again for use once being moved to the working position.

In a preferred configuration, the devices for detecting the folding process and/or the initiation of the folding process are formed as angle sensors.

Figure 2:
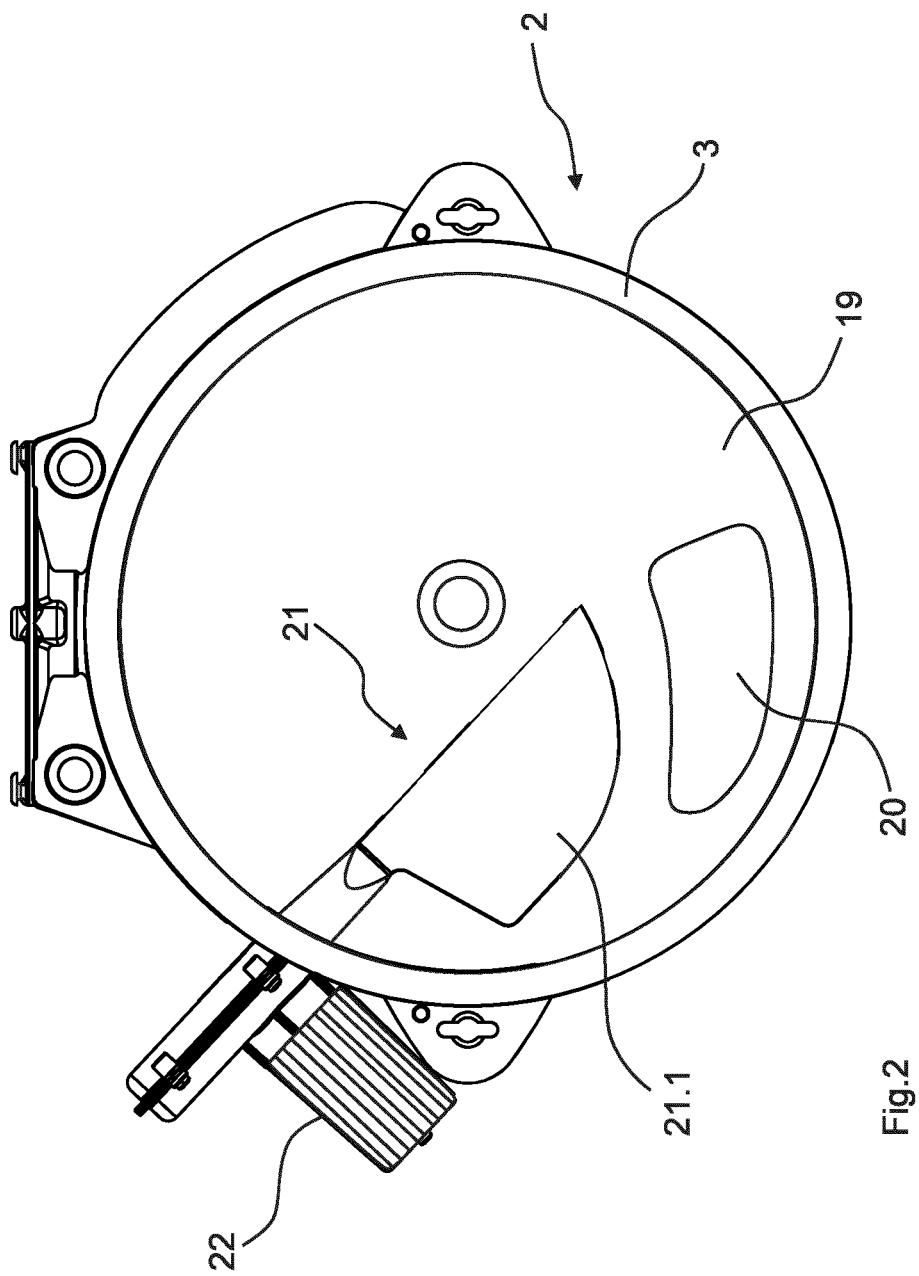
Figure 3:
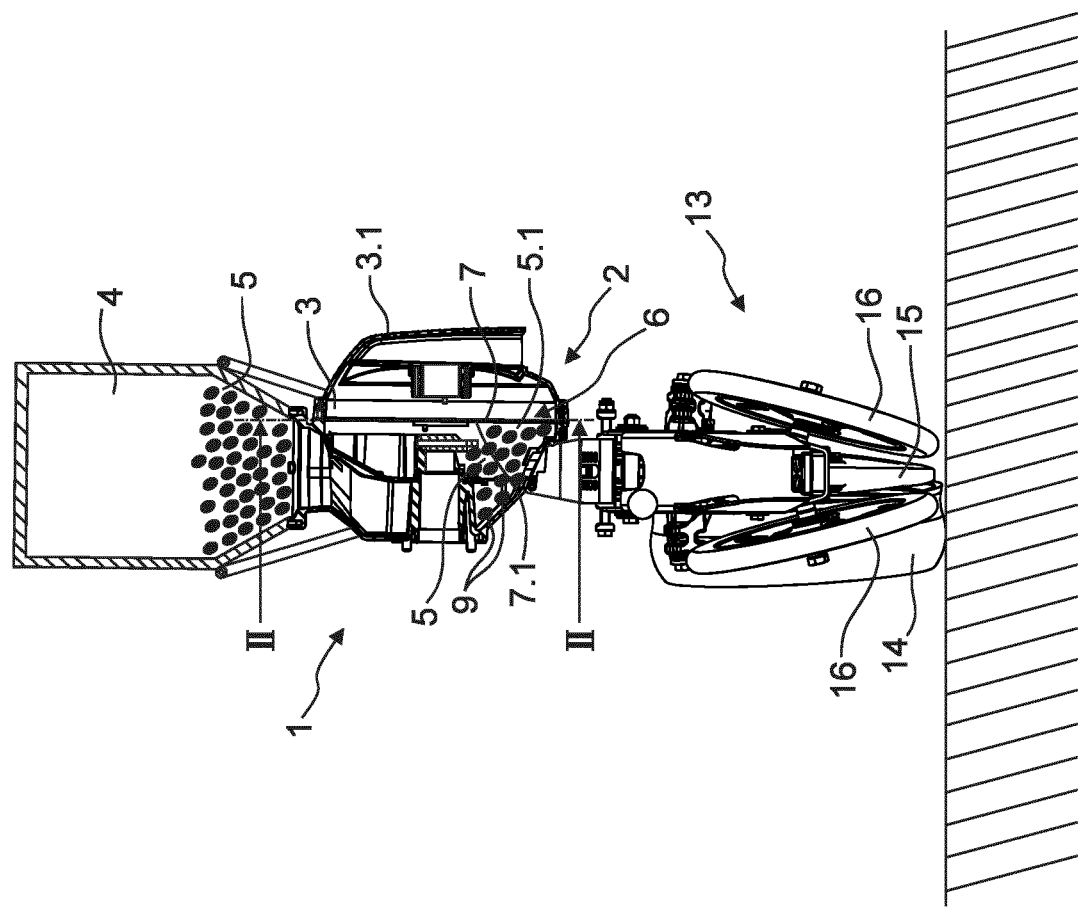
Figure 4:
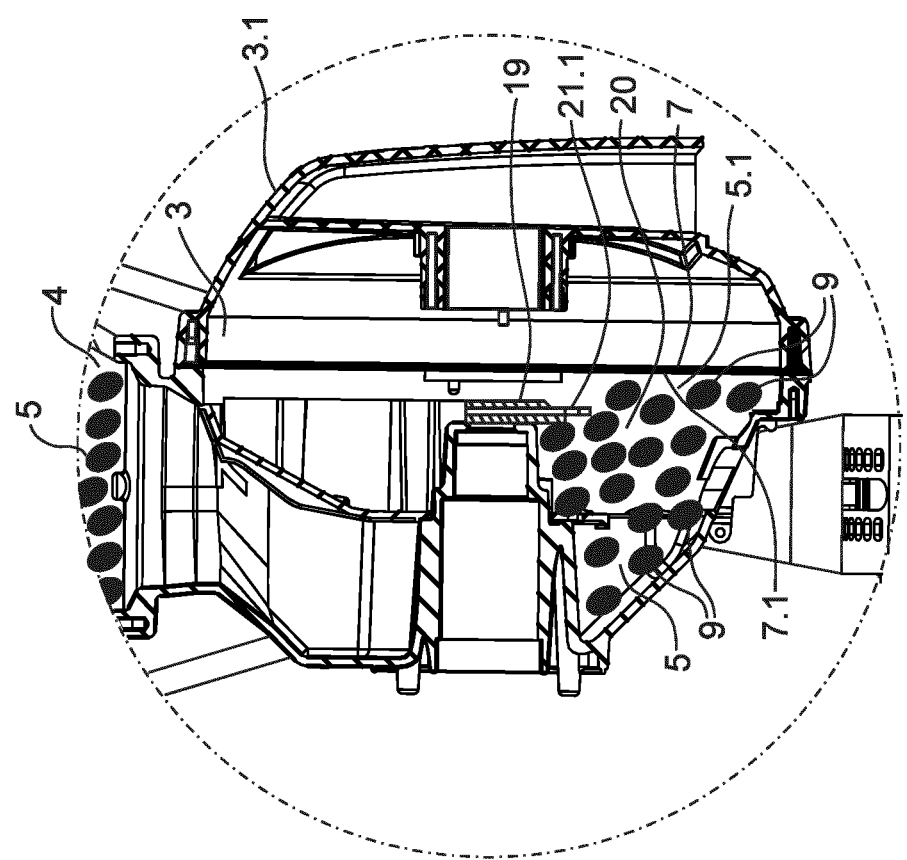
Figure 5:
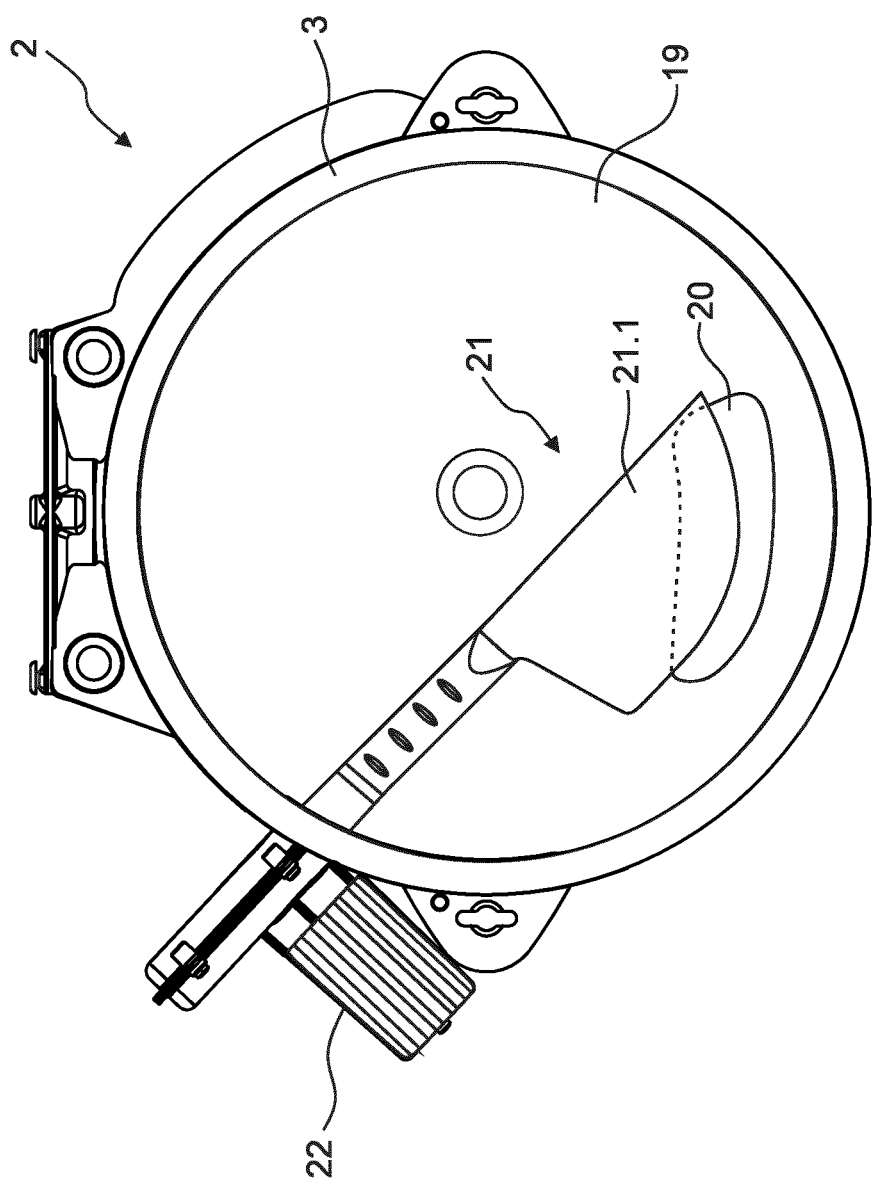
Figure 6:
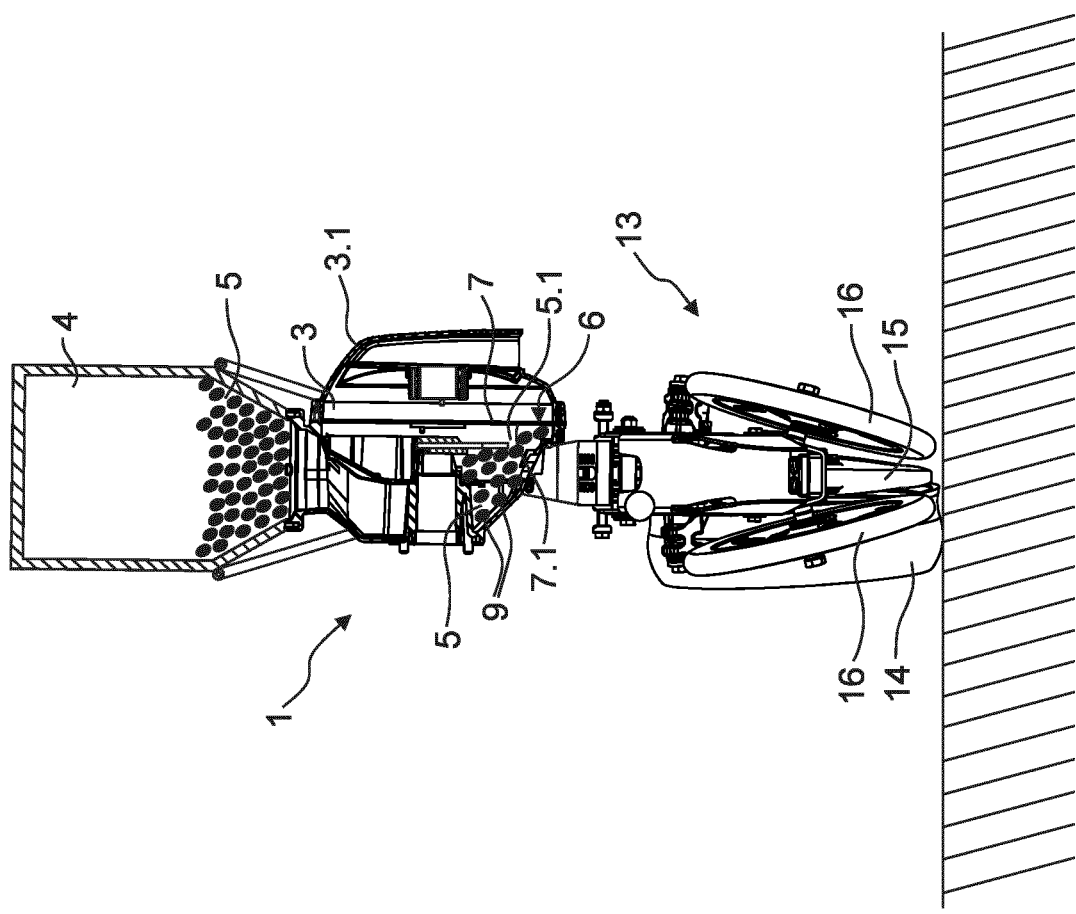
Figure 7:
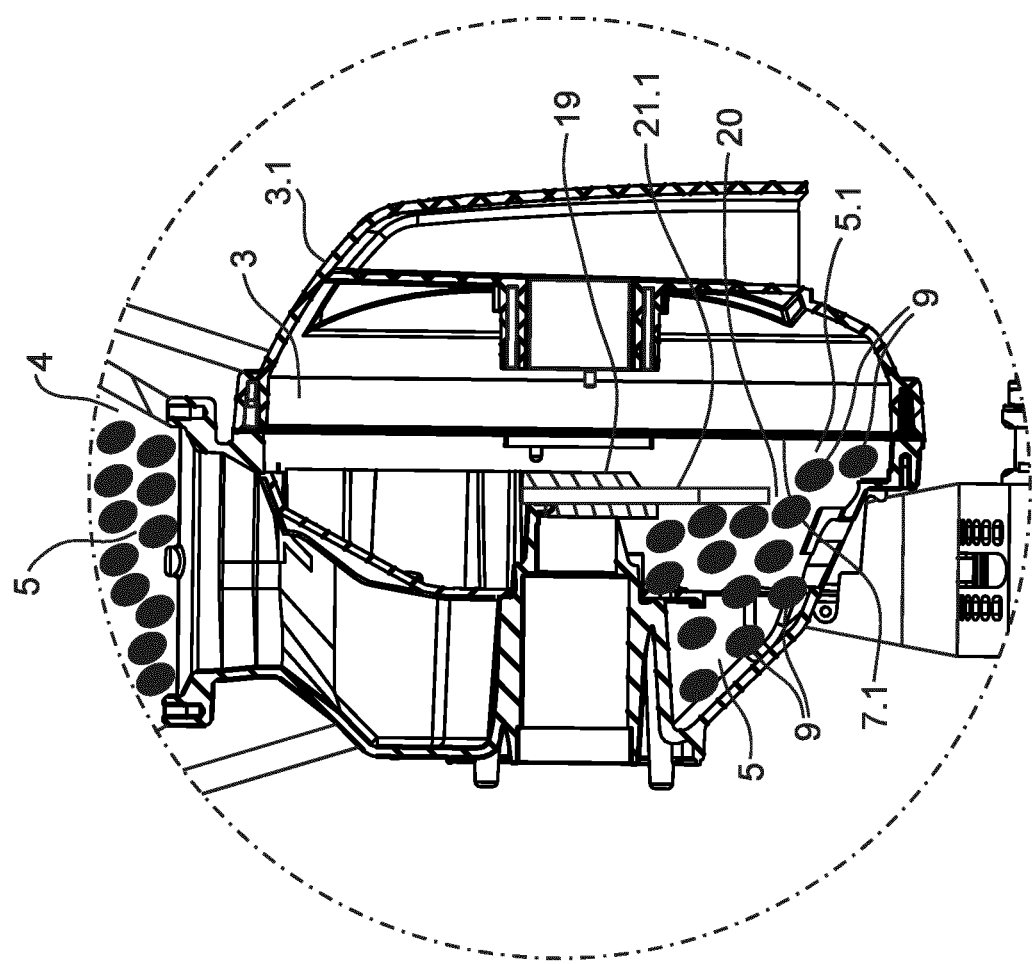
Figure 8:
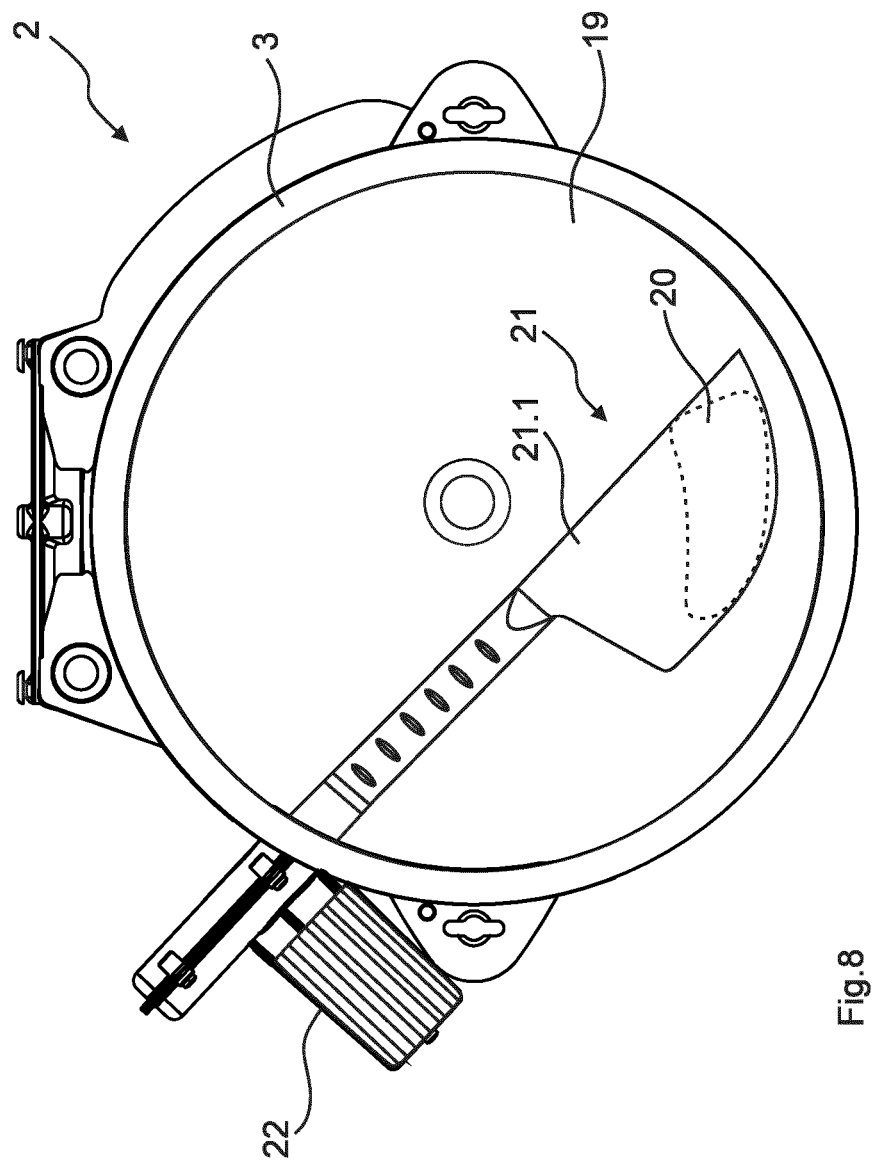
Figure 9:
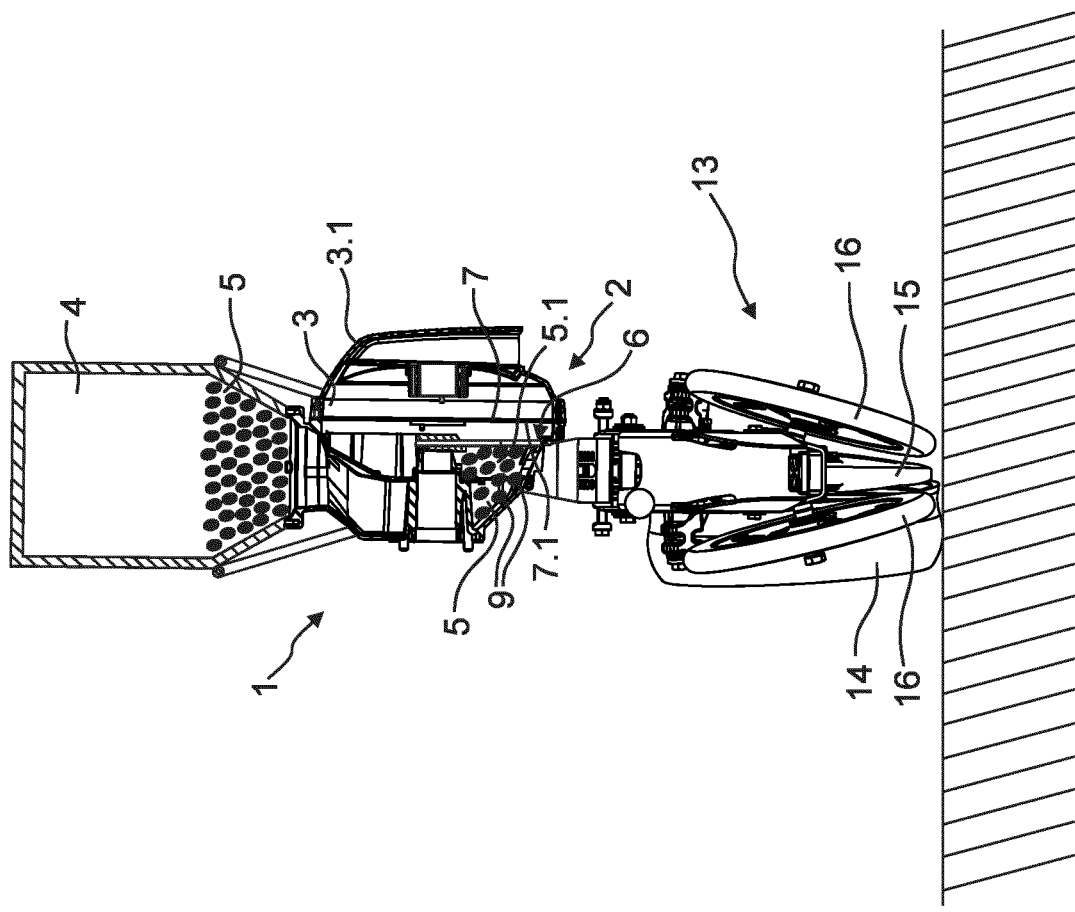
Figure 10:
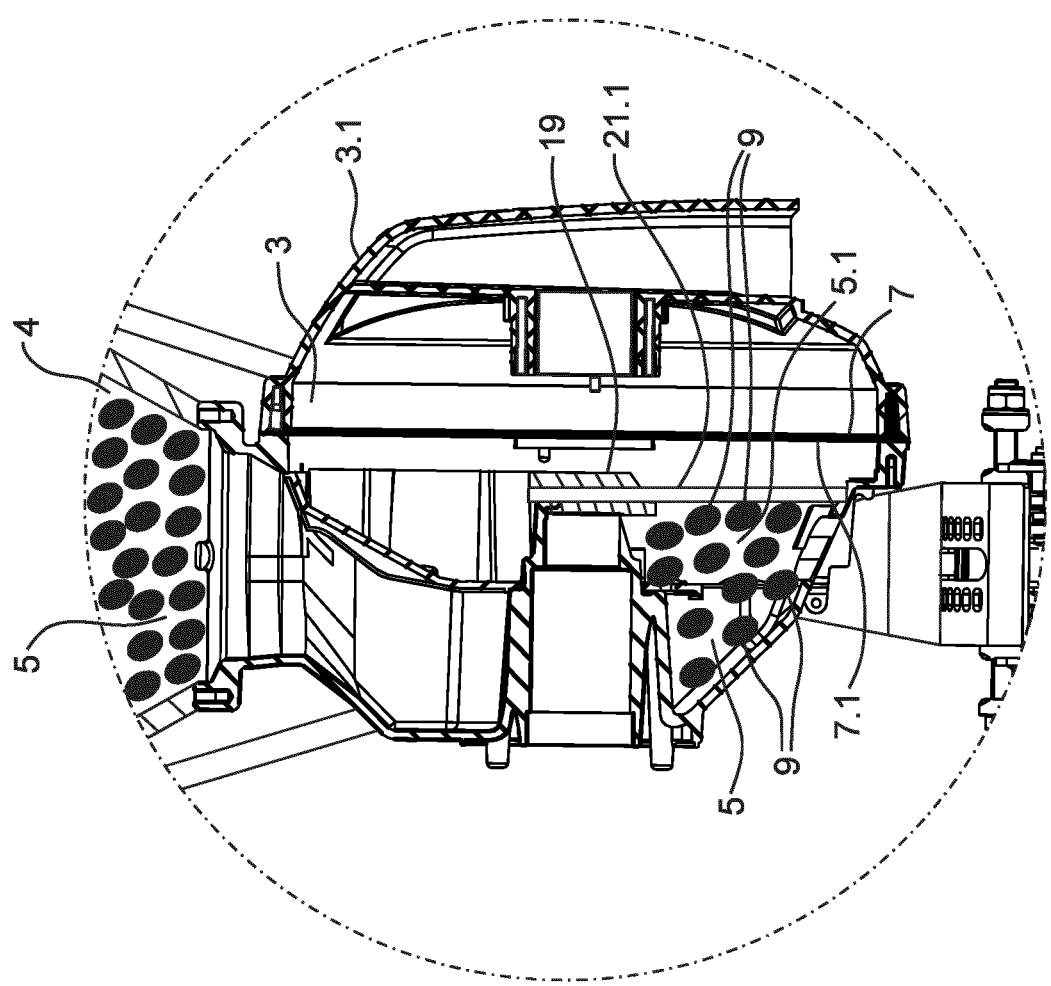
Figure 11:
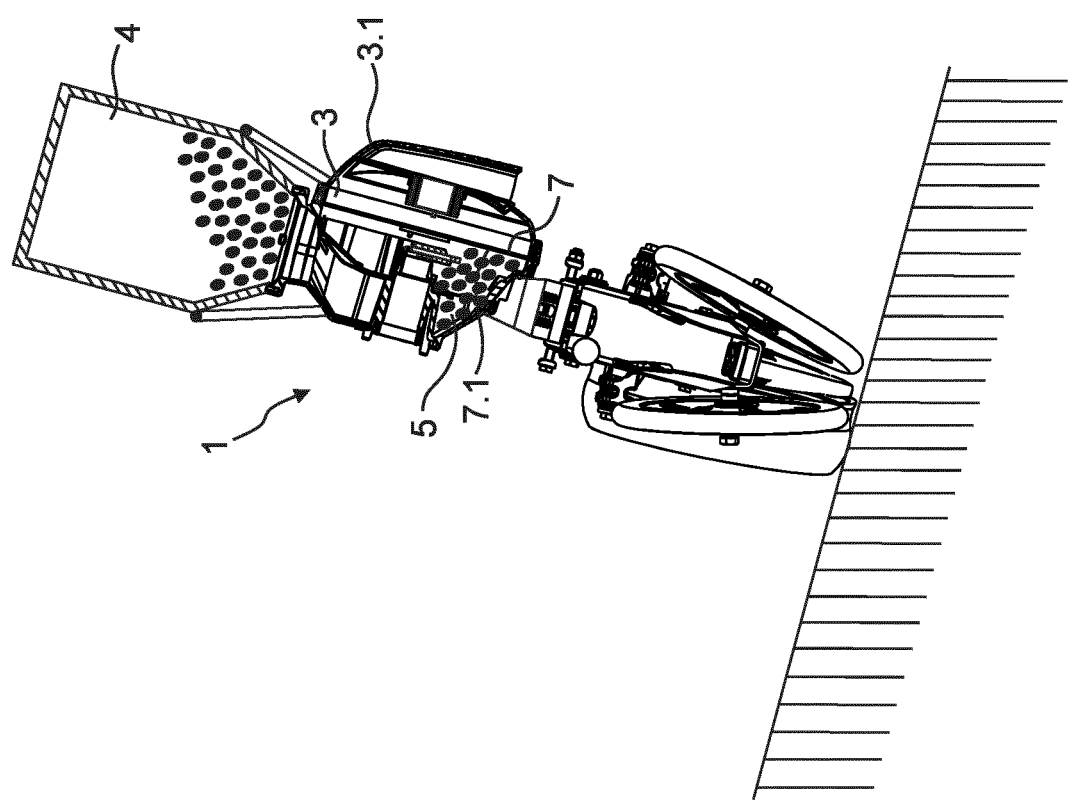
Figure 12:
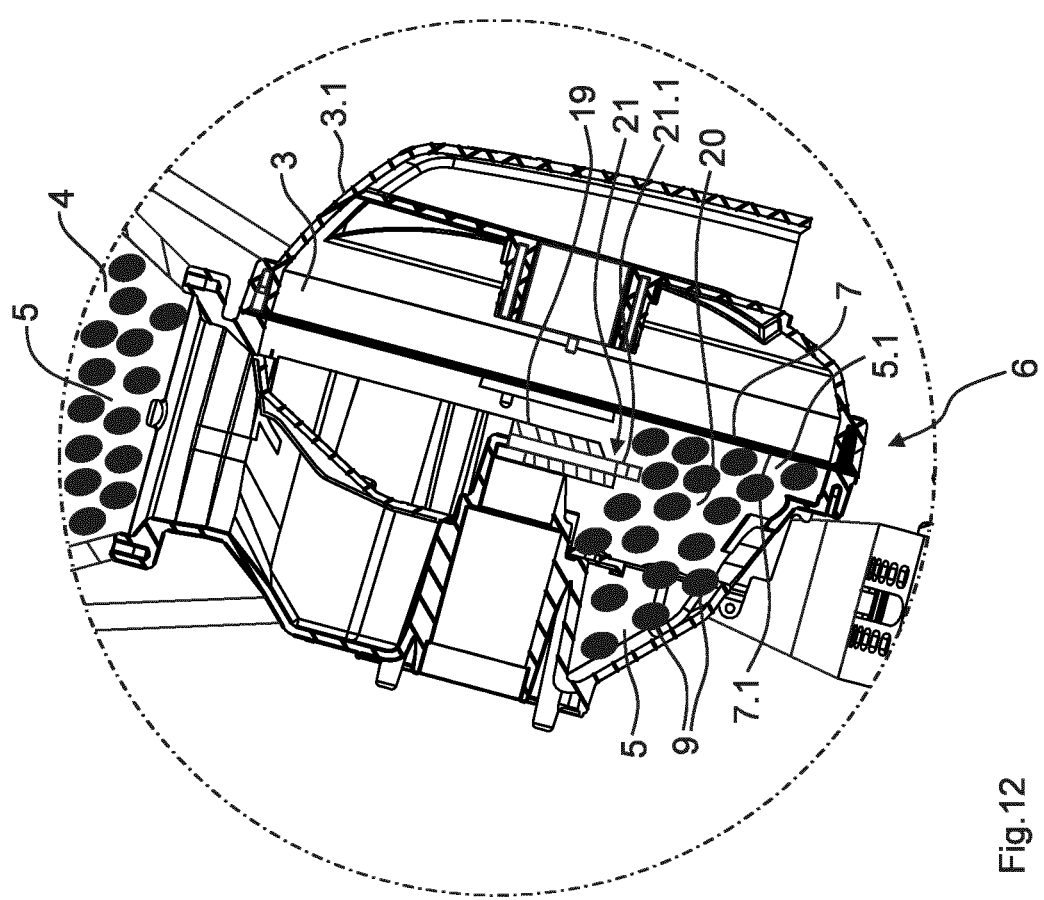
Figure 13:
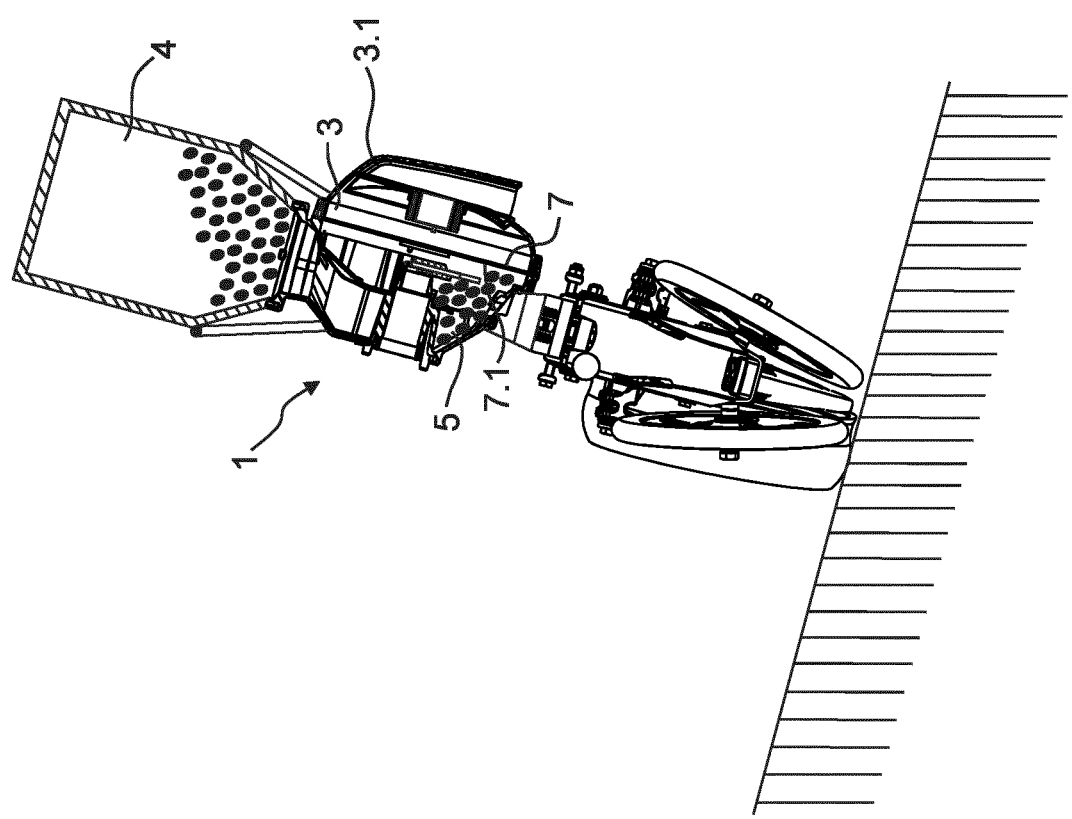
Figure 14:
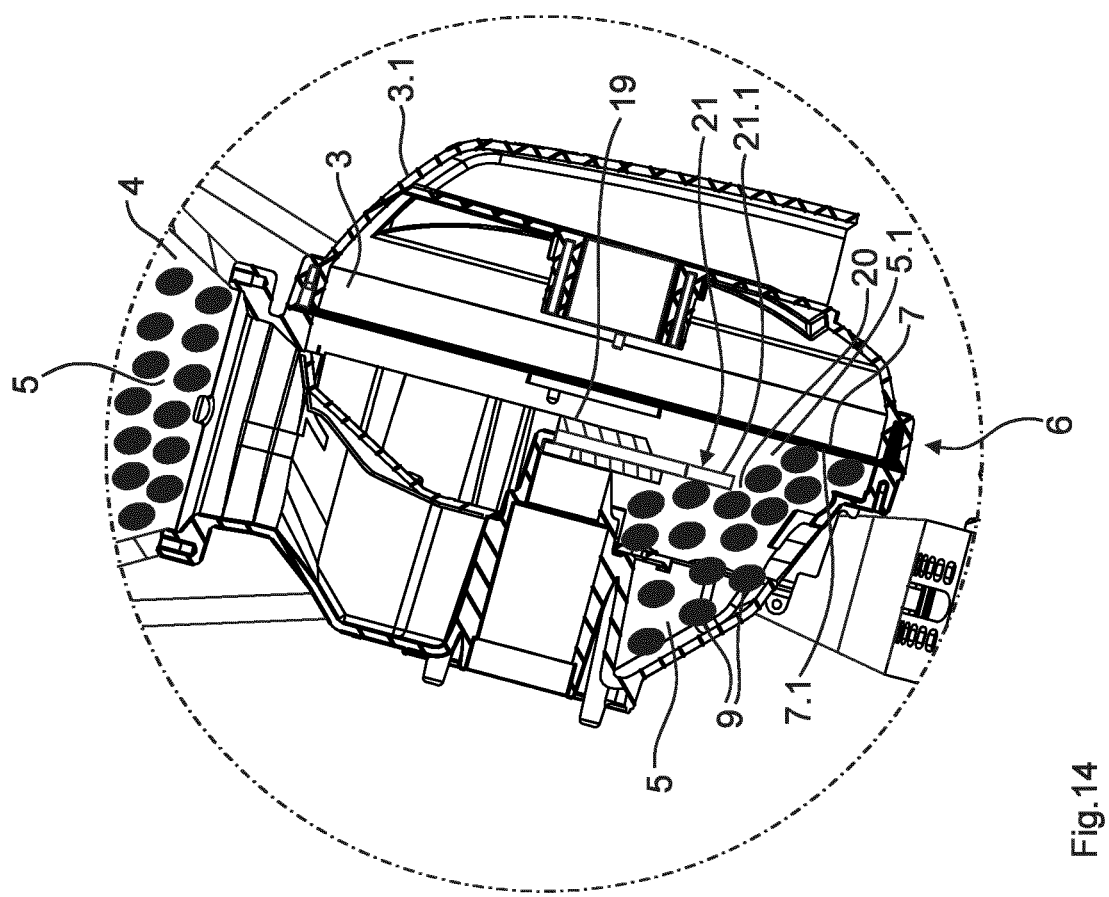
Figure 15:
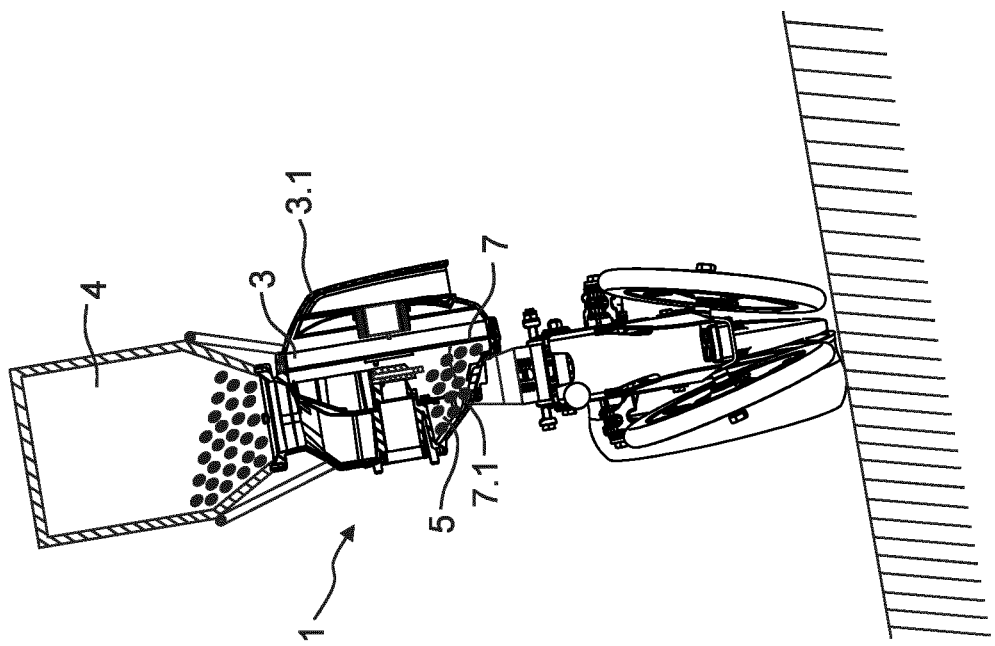
Figure 16:
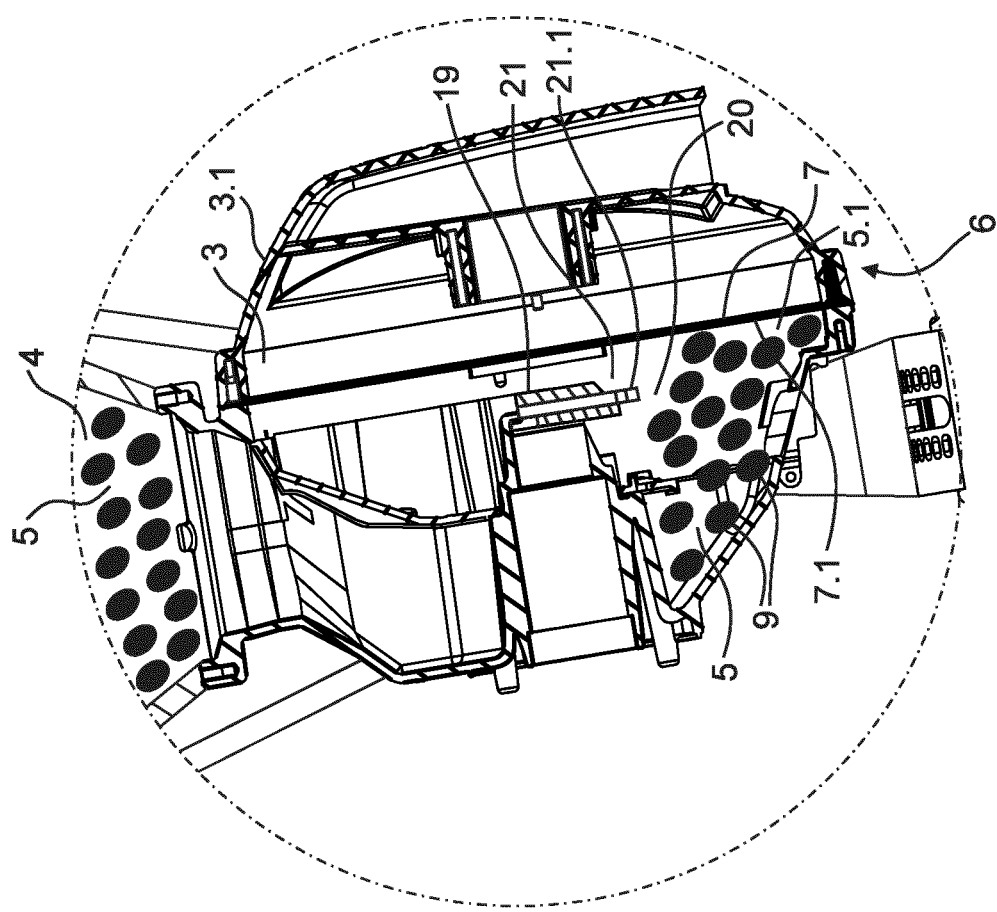
Figure 17:
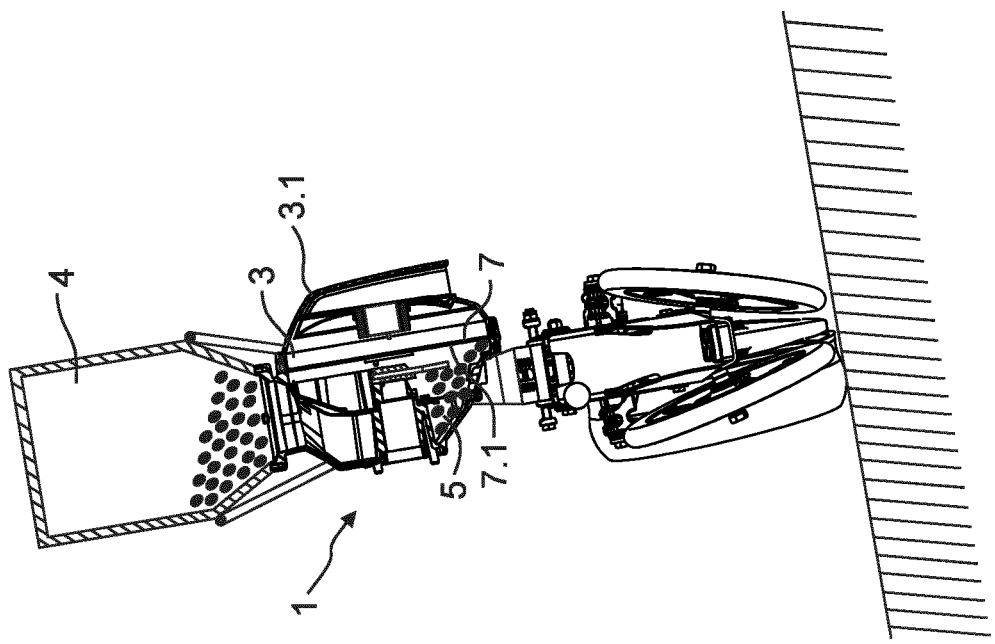
Figure 18:
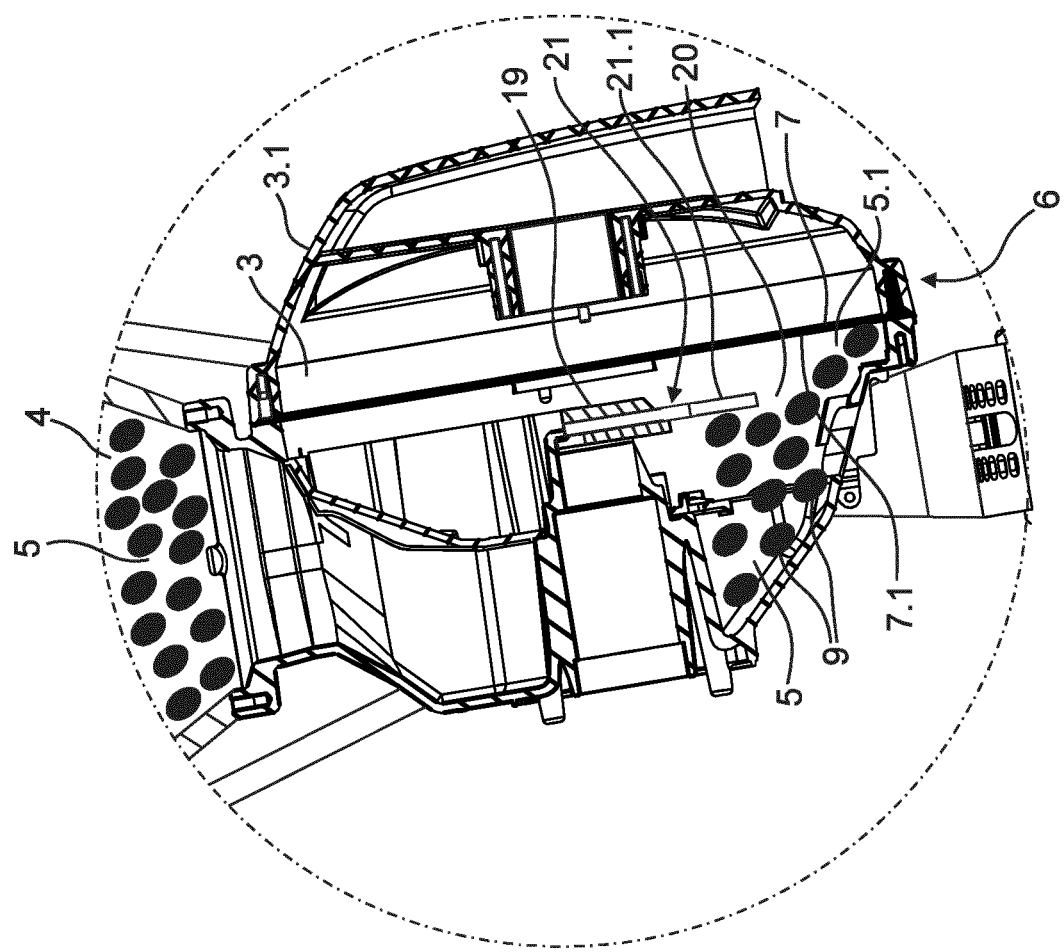
Figure 19:
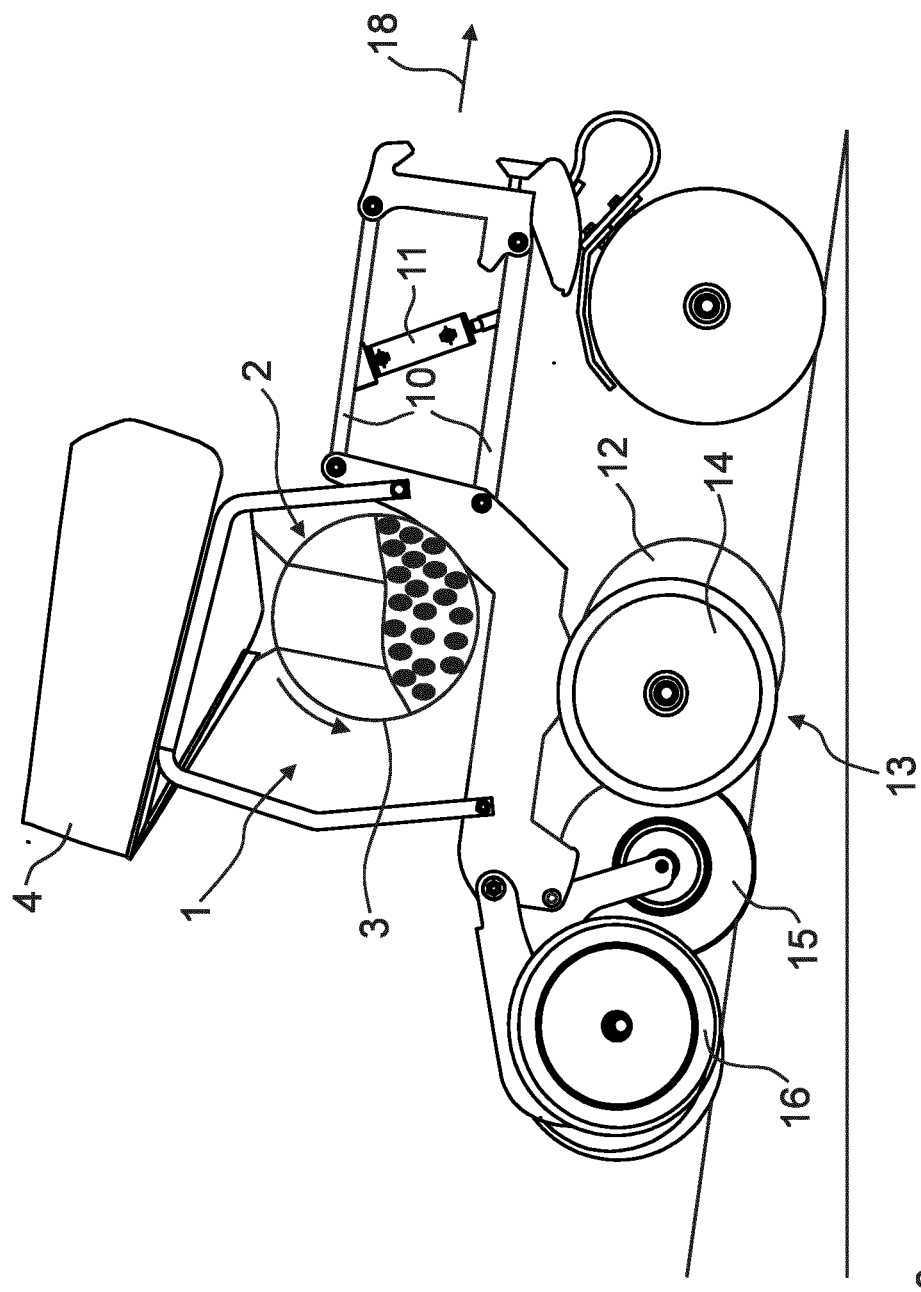
Figure 20:
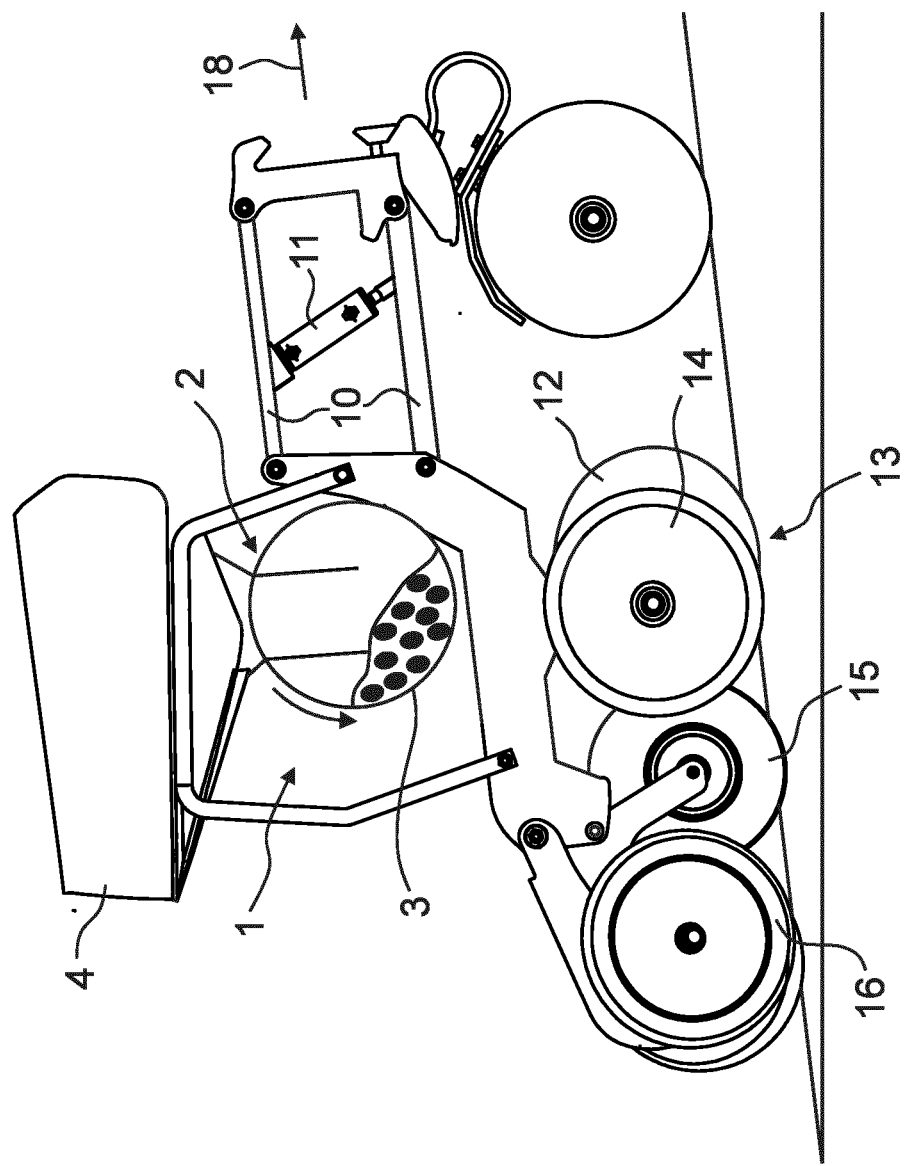
Figure 21:
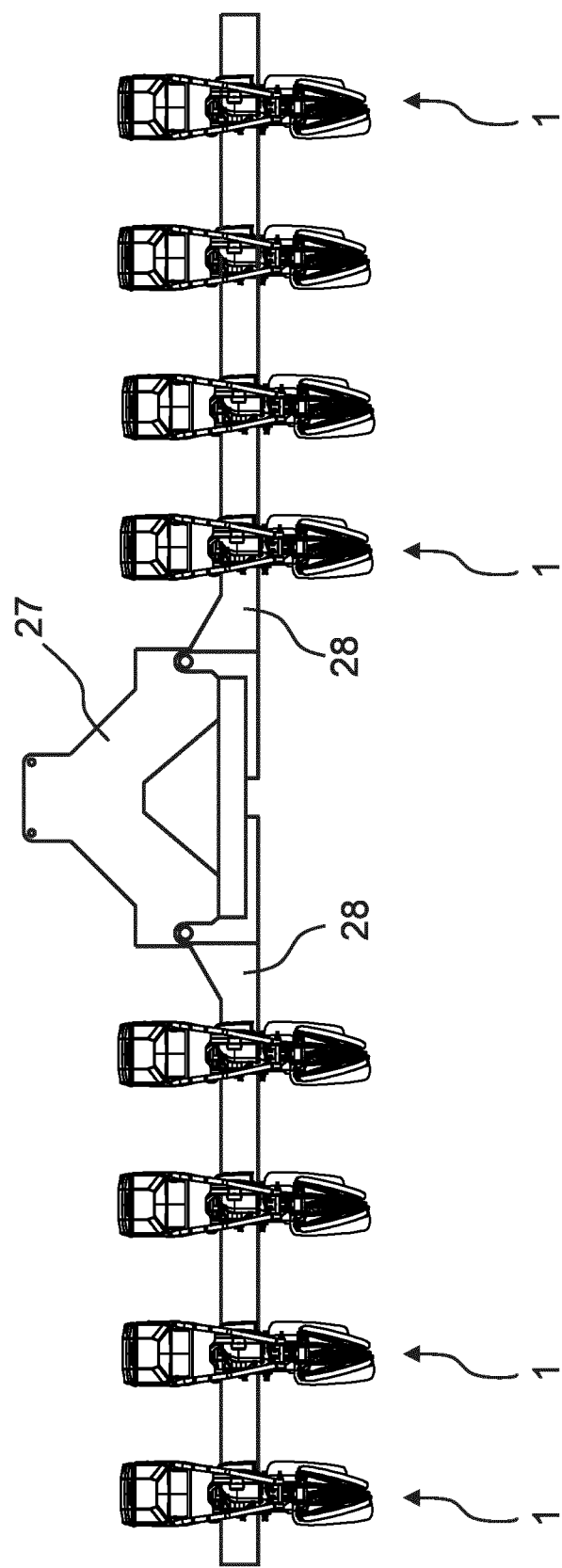
Figure 22:
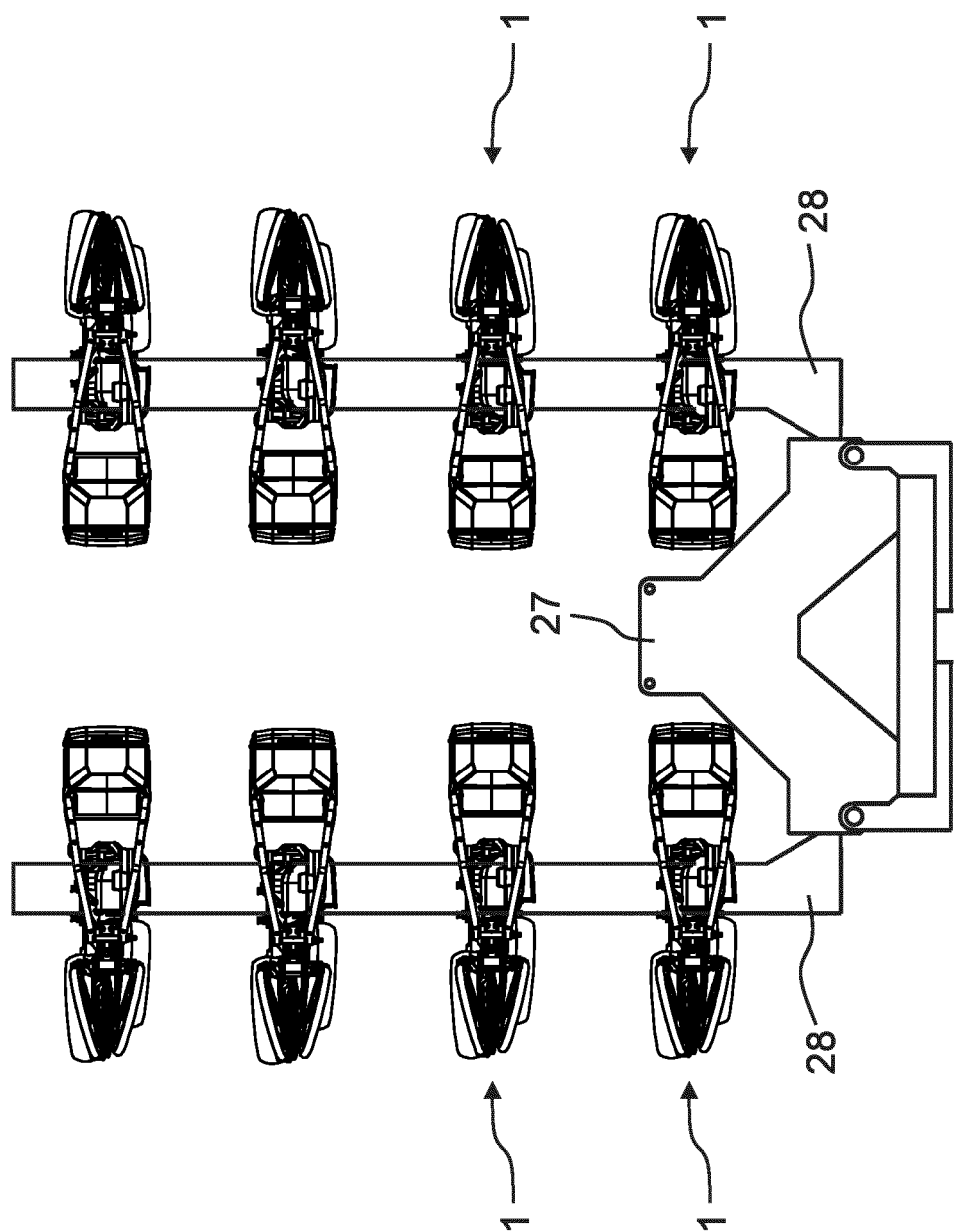
Figure 23:
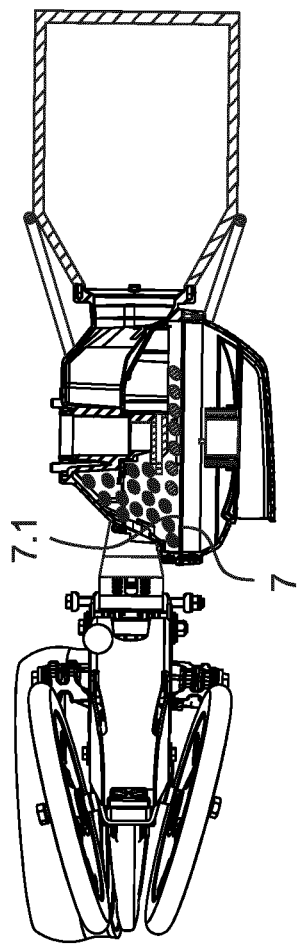
Figure 24:
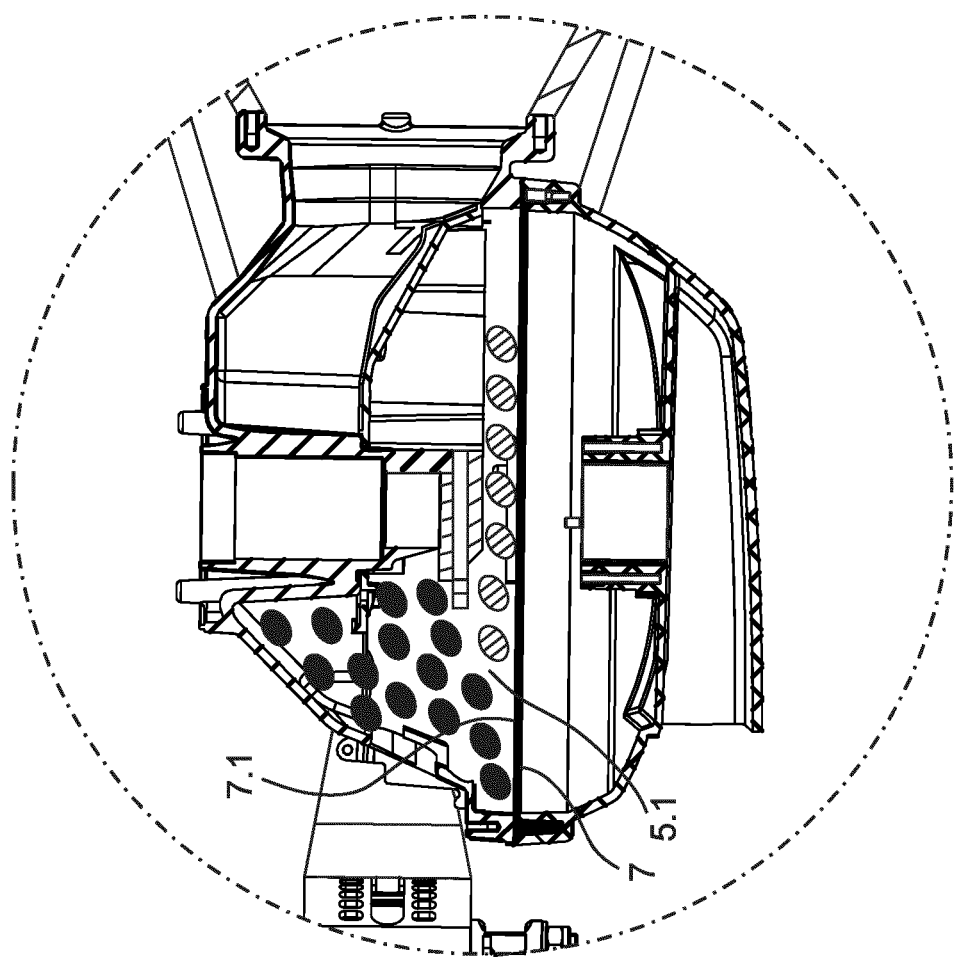
Figure 25:
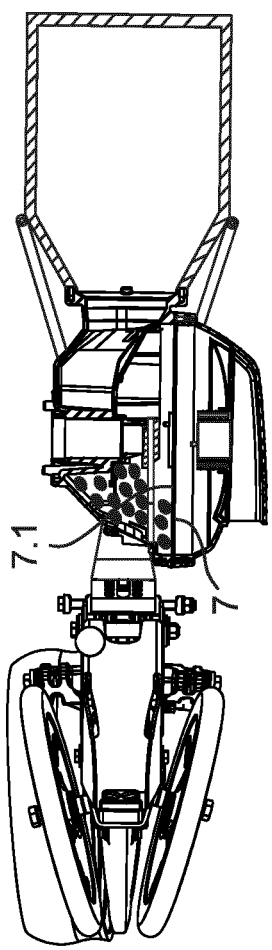
Figure 26:
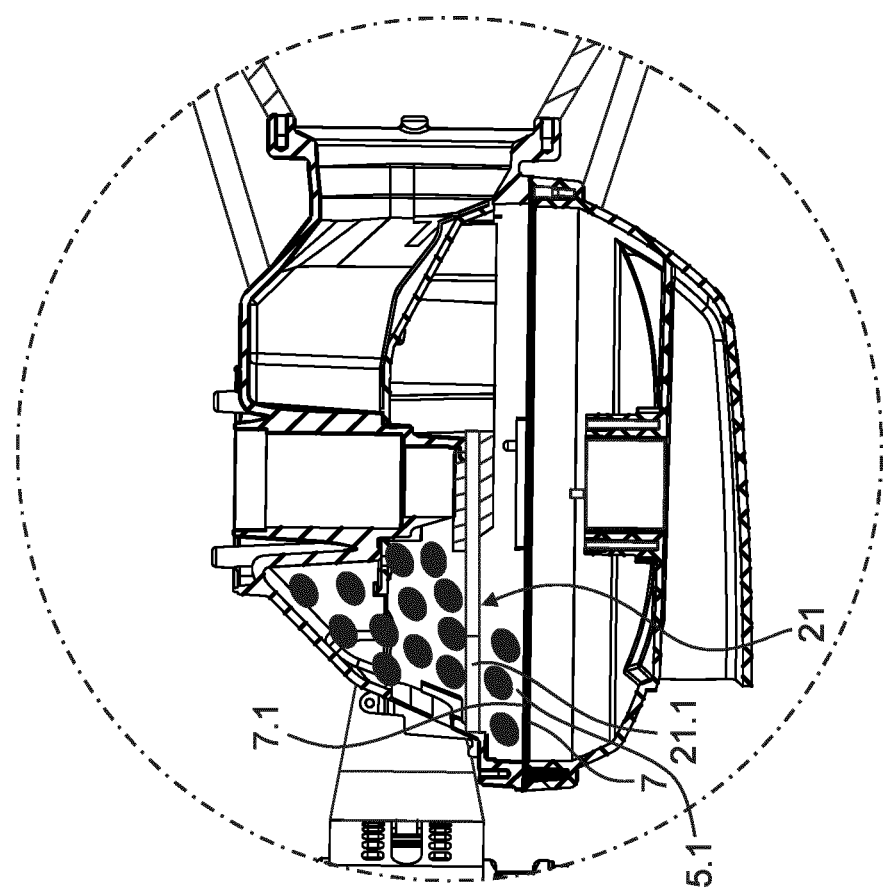

Further details of the invention can be gathered from the description of the examples and the drawings, where the drawing in FIG. 1 shows a single grain sowing unit as an agricultural machine with a metering system in a side view and in a simplified illustration, FIG. 2 shows the separating housing of the metering system of the single grain sowing unit according to FIG. 1 with the closure cover closing the separation chamber removed, where the slide fully opens the passage opening disposed in a partition wall that is arranged between the storage container and the seed storage chamber in view II-II and on a larger scale, FIG. 3 shows the single grain sowing unit in view III-III with the adjustment of the slide for fully opening the passage opening according to FIG. 2, FIG. 4 shows the separating housing of the metering system in a detail illustration according to FIG. 3, but on an enlarged scale, FIG. 5 shows the separating housing of the metering system of the single grain sowing unit according to FIG. 1 with the closure cover closing the separation chamber removed, where the slide partially opens the passage opening disposed in a partition wall that is arranged between the storage container and the seed storage chamber in the view according to FIG. 2 and on a larger scale, FIG. 6 shows the single grain sowing unit in the view according to FIG. 3 with the adjustment of the slide for fully opening the passage opening according to FIG. 5, FIG. 7 shows the separating housing of the metering system in a detail illustration according to FIG. 6, but on an enlarged scale, FIG. 8 shows the separating housing of the metering system of the single grain sowing unit according to FIG. 1 with the closure cover closing the separation chamber removed, where the slide fully closes the passage opening disposed in a partition wall that is arranged between the storage container and the seed storage chamber in the view according to FIG. 2 and on a larger scale, FIG. 9 shows the single grain sowing unit in the view according to FIG. 8 with the adjustment of the slide for fully closing the passage opening according to FIG. 8, FIG. 10 shows the separating housing of the metering system in a detail illustration according to FIG. 93, but on an enlarged scale, FIG. 11 shows the single grain sowing unit in the manner of illustration according to FIG. 3 with the adjustment of the slide for fully opening the passage opening according to FIG. 2 but when used when travelling transverse to a slope when the passage opening is disposed on the upslope side with respect to the separating device, FIG. 12 shows the separating housing of the metering system in a detail illustration according to FIG. 11, but on an enlarged scale, FIG. 13 shows the single grain sowing unit in the manner of illustration according to FIG. 3 with the adjustment of the slide for partially opening the passage opening according to FIG. 6 but when used when travelling transverse to a slope when the passage opening is on the downslope side with respect to the separating device, FIG. 14 shows the separating housing of the metering system in a detail illustration according to FIG. 13, but on an enlarged scale, FIG. 15 shows the single grain sowing unit in the manner of illustration according to FIG. 3 with the adjustment of the slide for fully opening the passage opening according to FIG. 2, but when used when travelling transverse to a slope when the passage opening is disposed on the downslope side with respect to the separating device, FIG. 16 shows the separating housing of the metering system in a detail illustration according to FIG. 15, but on an enlarged scale, FIG. 17 shows the single grain sowing unit in the manner of illustration according to FIG. 3 with the adjustment of the slide for partially opening the passage opening according to FIG. 6, but when used when travelling transverse to a slope when the passage opening is disposed on the downslope side with respect to the separating device, FIG. 18 shows the separating housing of the metering system in a detail illustration according to FIG. 17, but on an enlarged scale, FIG. 19 shows the single grain sowing unit in the manner of illustration according to FIG. 1, but when used when travelling down a slope, FIG. 20 shows the single grain sowing unit in the manner of illustration according to FIG. 1, but when used when travelling down a slope, FIG. 21 shows the agricultural machine configured as a single grain sowing machine in a rear view in the working position, FIG. 22 shows the agricultural machine configured as a single grain sowing machine in a rear view in the transport position, FIG. 23 shows the separating housing of the metering system in a detail illustration with the machine in the transport position according to FIG. 22, but on an enlarged scale, where the slide does not close the passage opening, FIG. 24 shows the separating housing of the metering system in a detail illustration according to FIG. 23, but on an enlarged scale, FIG. 25 shows the separating housing of the metering system in a detail illustration with the machine in the transport position according to FIG. 21, but on an enlarged scale, where the slide closes the passage opening, and FIG. 26 shows the separating housing of the metering system in a detail illustration according to FIG. 25, but on an enlarged scale.

An agricultural machine configured as a single grain sowing machine comprises in a manner not shown several single grain sowing units 1 arranged spaced from one another on a support frame, not shown, that extends transverse to the direction of travel. Single grain sowing units 1 comprise a metering system 2 with a separating housing 3. Arranged above separating housing 3 is a storage container 4 for receiving a supply 5 of seed. A known separating device 6 of metering system 2 is arranged in separating housing 3 which comprises a removable cover 3.1. This known separating device 6 comprises a separating disk 7 driven to rotate with known separating openings which are subjected to a pressure difference by way of a pressure system comprising at least one blower 8 so that seed grains 9 from supply 5 of seed attach at the separating openings as they pass through a supply 5 of seed. Separating housing 3 is closed by a removable closure cover 3.1 so that separating disk 7 arranged in a removable manner at separating housing 3 can be serviced and replaced.

The pressure system for generating a pressure difference at the separating openings of separating disk 7 can be configured, as is generally known, as a negative pressure or positive pressure system.

Respective single grain sowing unit 1 is arranged to be movable in an upright plane by way of a parallelogram linkage arrangement 10 on a cross beam, not shown, of a support frame. A mechanical or hydraulic spring and/or excavation element 11 is associated with parallelogram linkage arrangement 10. Furthermore, single grain sowing unit 1 comprises coulter unit 13 configured as a double disk coulter 12 with depth guide rollers 14 and a downstream catch roller 15 and seed press-on rollers 16 in a known manner. A seed line 17 leads from separating device 5 in separating housing 3 to coulter unit 13. End 17.1 of seed line 17 is oriented in a direction opposite direction of travel 18. As shown schematically in FIG. 1, seed grains 9.1 separated by separating device 5 are guided via seed line 17 to its end 17.1 and caught by catch roller 15 and deposited in the seed furrow created by coulter unit 13. The seed furrow is closed and seed grains 9 deposited in the seed furrow are covered and pressed on in a known manner by downstream press-on rollers 16. Seed grains 9.1 are guided in seed line 17 by a flow of compressed air that is introduced into the seed line and that accelerates the separated seed grains 9.1 in the direction toward end 17.1 of seed line 17.

Disposed on separating side 7.1 of separating device 5 configured as a separating disk 7 in distributor housing 3 is an associated seed storage chamber 5.1 which is directly connected to storage container 4. This seed storage chamber 5.1 is connected to storage container 4 so that seed grains 9 disposed in storage container 4 reach it. A partition wall 19 is arranged between storage container 3 and seed storage chamber 5.1. Arranged in partition wall 19 is a seed passage opening 20 in the embodiment through which seed grains 9 pass from storage container 4 into seed storage chamber 5.1 to separating side 6.1 of separating disk 6. Passage opening 20 is associated with an adjustable slide element 21.1 configured as a slide 21 for adjusting the opening width of passage opening 20. A motorized adjustment element 22 is associated with slide element 21.1. The opening width of passage opening 20 can therefore be adjusted by way of this motorized adjustment element 22.

Three exemplary settings of slide 21 for adjusting the passage size of passage opening 20 shall be briefly mentioned below using a few drawings for easier understanding:

Slide 21 in FIGS. 2 to 4 is set such that entire passage opening 20 is open.

Slide 21 in FIGS. 5 to 7 is set such that the passage size of passage opening 20 is opened to approximately half the passage size of passage opening 20.

Slide 21 in FIGS. 8 to 10 is set such that passage opening 20 is fully closed.

Of course, intermediate positions of the passage size for passage opening 20 can also be set by way of slide 21 depending on the application and the conditions of use.

An on-board computer 23 is associated with the single grain sowing machine. Motorized actuating element 22 is connected to electronic on-board computer 23 by way of a data transmission device in the embodiment configured as a data line 24. On-board computer 23 comprises at least one memory. Data for setting the passage size of passage opening 20 determined by the slide position of slides 21 are saved and/or stored in the at least one memory of on-board computer 23. Motorized actuating element 22 for adjusting the passage size of passage opening 20 can be actuated and/or is to be actuated according to the stored data for adjusting the slide setting of slides 21. With corresponding manual input, it is also possible to control and actuate motorized actuating element 22 of slide 21 for adjusting the passage size of passage opening 20 manually by way of a respective actuating device (not shown) or by way of on-board computer 23.

The data saved and/or stored in the memory of on-board computer 23 for adjusting the passage size of passage opening 20 by way of slide 11 is at least dependencies between passage size 20 of the passage opening determined by the slide position of slides 21, on the one hand, and on the other hand, the type of seed, the spreading quantity, the filling level of seed in the chamber between the partition wall and the separating side of the separating device and/or the slope inclination. In at least one memory of on-board computer 23, dependencies between the passage size of passage opening 20 determined by the slide position of slide 21, on the one hand, and the type of seed, the spreading quantity, and/or the slope inclination, on the other hand, are saved and/or stored. Motorized actuating element 22 is actuated at least according to one of the aforementioned dependencies by on-board computer 23 to adjust the passage size of passage opening 20, as already briefly mentioned above with reference to FIGS. 2 to 10 and as shall be explained in more detail below.

As already described above, separating device 6 comprises at least one separating element driven to be rotatable which is configured as a separating disk 7 with separating openings. The separating openings of separating disk 7 are subjected to a pressure difference in a known manner by way of a pneumatic pressure-generating device configured as a motor-driven blower 8. As they pass through seed storage 5, seed grains 9 to be separated and spread attach at these separating openings of separating disk 7 which are subjected to a pressure difference. The separating element configured as a separating disk 7 comprises at least one wiper element that is arranged to be adjustable in the immediate vicinity of the separating openings, as is generally known and is therefore not shown. This adjustable wiper element is also associated in a known manner with a motorized actuating element (also not shown). This motorized actuating element is also connected to electronic on-board computer 23 by way of a data transmission device (not shown), in particular a data line. Data for adjusting the at least one wiper element is saved and/or stored in at least one memory of on-board computer 23. Accordingly, the motorized actuating element of the wiper element can be actuated, is to be actuated and/or is actuated accordingly for its adjustment.

The data for adjusting the slide position of slide element 21.1 of slide 21 and for adjusting the wiper element are linked with one another so that they can be actuated, are to be actuate and/or are actuated in a corresponding manner at the corresponding point in time according to the saved and/or stored data on the respectively associated motorized adjustment elements of slide element 21.1 and the wiper element.

On-board computer 23 comprises at least one input device which is not described in detail. Using this input device, the type of seed, the desired spreading quantity, in particular the number of seed grains to be spread per unit area or distance traveled, a corresponding, in particular the expected and/or actual slope inclination of the field to be tilled, an average slope inclination is to be entered and/or can be entered manually by way the input device and/or by way of at least one sensor 25 for determining the slope inclination and/or be transmitted via a data line. This at least one sensor 25 for determining the slope inclination is arranged either on the frame of the single grain sowing machine or, as shown in FIG. 1, on each individual single grain sowing unit. In the latter case, such a sensor 25 for determining the slope inclination is associated with each individual single grain sowing unit. This sensor 25 for determining the slope inclination is connected to on-board computer 23 by way of a data transmission device configured as a data line 26 and then transmits corresponding data about the respective slope inclination online to on-board computer 23. It is also possible to store a field map in the memory of on-board computer 23 in which the respective location-specific slope inclination is stored. This respectively stored data on the slope inclination can then be retrieved accordingly during operation in a location-specific manner via on-board computer 23 which operates together with a GPS receiver (not shown), so that on-board computer 23 can then actuate actuating element 22 of slide 21 to adjust the passage size of passage opening 20 in the partition wall accordingly and set it accordingly, as shall be explained in more detail below.

As explained above, the respective current inclination of the metering system 2 during operation is determined by the arrangement of sensor 25 for determining the slope inclination and transmitted to on-board computer 23. The data of the slope inclination determined by sensor 25 for determining the slope inclination can be transmitted and/or is transmitted via a data line 26 to on-board computer 23 so that actuating elements 22 of respective slide element 21.1 of slide 21 and/or or of the respective wiper element can be actuated accordingly by on-board computer 23.

Various situations for the employment of the single grain sowing machine when using the single grain sowing machine on a slope shall be described below.

The first situation described below according to FIGS. 11 to 14 pertains to traveling transverse to the slope when seed passage opening 20 in partition wall 19 is disposed on the upslope side with respect to separating side 7.1 of separating disk 7 of the separating device. Seed storage chamber 5.1 is therefore presently on the upslope side with respect to separating device 6.

According to the illustrations in FIGS. 11 to 12, slide element 21.1 of slide 21 is disposed in a position in which seed passage opening 20 is fully opened by slide element 21.1. Due to the above-described slope inclination of the single grain sowing unit, too many seed grains 9 reach the separating disk as a result of seed passage opening 20 being fully open so that the reception and adhesion of seed grains 9 to be separated at the separating openings of separating disk 7 for separating seed grains 9 is impeded. In order to improve this, actuating element 22 of slide element 21.1 of slide 21 is adjusted by on-board computer 23 such that the passage size of seed passage opening 20 is reduced from the largest passage size of passage opening 20 shown in FIGS. 11 to 12, such that, for example, only a partial opening of passage opening 20 is given there according to the passage size of passage opening 20 shown in FIGS. 13 to 14. Due to the reduced passage size of passage opening 20, fewer seed grains 9 now directly reach seed storage chamber 5.1 directly on separating side 7.1 of separating disk 7, as is shown by a comparison of FIG. 12 to FIG. 14.

The second situation described below according to FIGS. 15 to 18 pertains to respectively traveling transverse to the slope when seed passage opening 20 in partition wall 19 is on the downslope side with respect to separating side 7.1 of separating disk 7 of the separating device. Seed storage chamber 5.1 is presently therefore on the downslope side with respect to separating device 6.

According to the illustrations in FIGS. 15 to 16, slide element 21.1 of slide 21 is disposed in a position in which seed passage opening 20 is fully opened by slide element 21.1. Due to the above-described slope inclination of the single grain sowing unit, a sufficient number of seed grains 9 presently reaches separating side 7.1 of separating disk 7 so that the reception and adhesion of seed grains 9 to be separated at the separating openings of separating disk 7 is sufficient for separating seed grains 9.

According to the illustration in FIGS. 17 to 18, a reduced passage size of passage opening 20 is presently adjusted by setting slide element 21.1 accordingly using on-board computer 23 such that only a partial opening of passage opening 20 is given there. In this situation, there is no sufficient supply of seed in seed storage chamber 5.1. disposition of seed grains 9 to the separating openings of separating disk 7 on its separating side 7.1.

In order to improve this, actuating element 22 of slide element 21.1 of slide 21 is adjusted by on-board computer 23 in such a way that the passage size of seed passage opening 20 is increased from the reduced passage size of passage opening 20 shown in FIGS. 17 to 18, such that, for example, according to the passage size of passage opening 20 shown in FIGS. 13 to 14, the full opening of passage opening 20 is given there so that sufficient seed grains 9 can reach seed storage chamber 5.1 also in this application situation for seed grains 9 to attach at the separating openings of separating disk 7 at its separating side 7.1.

Passage opening 20 in partition wall 19 is therefore adjusted accordingly by on-board computer 23 according to the slope inclination by appropriately adjusting slide element 21.1, as described above.

With regard to FIGS. 11 to 18 and the above explanations, this can be described as follows:

When traveling transverse to the slope when seed passage opening 20 in partition wall 19 is disposed on the upslope side with respect to separating side 7.1 of separating device 6 formed as separating disk 7 in accordance with the operating conditions of FIGS. 11 to 14, so that seed storage chamber 5.1 is disposed on the downslope side with respect to separating device 6, the passage size of seed passage opening 20 in partition wall 19 is adjusted to be smaller by way on-board computer 23 by appropriate actuation of the actuating element of slide 21 based on the data of the slope inclination transmitted by inclination sensor 25 (see the illustration in FIGS. 13 and 14) than when seed passage opening 20 in partition wall 19 is disposed on the downslope side with respect to separating device 6 formed as separating disk 7 (see the illustration in FIGS. 15 and 16), so that seed storage chamber 5.1. is disposed on the upslope side with respect to separating device 6 formed as a separating disk 7.

When traveling transverse to the slope when the seed passage opening in partition wall 20 of separating device 6 is disposed on the downslope side with respect to separating side 7.1 of separating device 6 formed as separating disk 7 in accordance with the operating conditions of FIGS. 15 to 18, so that seed storage chamber 5.1 is disposed on the downslope side with respect to separating device 6, the passage size of seed passage opening 20 is adjusted to be smaller by way on-board computer 23 by appropriate actuation of actuating element 22 of slide 21 based on the data of the slope inclination transmitted by inclination sensors 25 (see the illustration in FIGS. 17 and 18) than when the seed passage opening in partition wall 19 is disposed on the upslope side with respect to separating device 6 formed as separating disk 7 (see the illustration in FIGS. 15 and 16) so that seed storage chamber 5.1. is disposed on the upslope side with respect to separating device 6.

The passage size of passage opening 20 in partition wall 19 is adjusted during the spreading travel on level ground by way of on-board computer 23 by appropriate actuation of actuating element 22 of slide 21 to an intermediate size compared to the settings when travelling transverse to the slope, when passage opening 20 in partition wall is on the downslope side with respect to separating device 6 formed as a separating disk 7 so that seed storage chamber 5.1 is disposed on the downslope side, or when passage opening 20 is disposed on the downslope side with respect to separating device 6 formed as a separating disk 7 so that seed storage chamber 5.1 is on the downslope side.

When travelling down the slope according to FIG. 19, the passage size of passage opening 20 in partition wall 19 is adjusted by way of on-board computer 23 by appropriate actuation of actuating element 22 of slide 21 to be smaller than when the agricultural machine is moving forward on an at least approximately horizontal surface. When travelling up the slope according to FIG. 20, the passage size of passage opening 20 in partition wall 19 is adjusted by way of on-board computer 23 by appropriate actuation of actuating element 22 of slide 21 to be larger than when the agricultural machine is moving forward on an at least approximately horizontal surface.

A sensor for determining the filling level of seed in storage chamber 5.1 is arranged in a manner not shown between partition wall 19 and separating side 7.1 of separating device 6 configured as a separating disk 7. This sensor transmits data regarding this filling level of seed to on-board computer 23. Motorized actuating element 22 of slide element 21 is actuated according to this data to set the passage size of passage opening 20 in partition wall 19 such that the desired seed supply for separating the seed grains on separating side 7.1 of separating disk 7 is available in the correct amount.

The agricultural machine according to the embodiment of FIGS. 21 and 22 is composed of at least two side frames 28, with metering systems 2 arranged thereon comprising single grain sowing units 21, each pivotable on a central part 27 about an axis extending in the direction of travel by at least approximately 90° by way of at least one motorized folding system from a working position according to FIG. 21 to a transport position according to FIG. 22 foldable transport position. Devices for detecting the folding process and/or the initiation of the folding process are associated with the motorized folding system. The devices for detecting the folding process and/or the initiation of the folding process are formed, for example, as angle sensors. Before or at the beginning of the folding process of side frames 28 with metering systems 2 arranged thereon 23 from the working position according to FIG. 21 to the transport position according to FIG. 22, these angle sensors each send corresponding signals to on-board computer 23, which in turn respectively sends to the respective motorized actuating element 22 of slide 21. With these respective signals to motorized actuating elements 22 of slide elements 21.1 of slide 21 of individual single grain sowing units 1, respective slides 21 are moved from the position shown in FIGS. 23 and 24 to a position according to FIGS. 25 and 26c closing passage opening 20 in partition wall 19.

This achieves or ensures that, when side frames 28 are folded in the transport position according to FIG. 22 and metering systems 2 of single grain sowing units 1 are in the transport position, no additional seed grains 9 can pass through seed passage opening 20 in partition wall 19, which is closed by slide element 21, into seed storage chamber 5.1 directly at separating side 7.1 of separating disk 9, as shown in FIGS. 25 and 26. Respective metering system 2 of each single grain sowing unit 1 is then ready for use again immediately after it has been moved to the working position according to FIG. 21.

The invention claimed is:

1. A metering_system of an agricultural machine comprising: a separating housing, a separating device of said metering system arranged in said separating housing, an associated seed storage chamber disposed on the separating side of said separating device in said separating housing, a storage container which is associated directly with said seed storage chamber of said separating housing, a partition wall which is arranged between said storage container and said seed storage chamber, at least one seed passage opening which is arranged in said partition wall, wherein a passage size of the at least one seed passage opening can be adjusted by at least one adjustable slide element of a slide by way of at least one adjustment element, wherein said at least one adjustment element of said adjustable slide element is configured as a motorized actuating element, in that said motorized actuating element is connected to an electronic on-board computer by way of a data transmission device, in particular a data line, in that data for adjusting the passage size of said passage opening determined by a slide position of said slide is saved and/or stored in at least one memory of said on-board computer and said motorized actuating element of said slide is actuatable and/or is actuated accordingly for adjusting the passage size of said passage opening.

2. The metering system according to claim 1, wherein the data saved and/or stored in said memory of said on-board computer for adjusting the passage size of said passage opening comprises at least dependencies between the passage size of said passage opening determined by the slide position of said slide a type of seed, a spreading quantity, a seed filling level in said chamber between said partition wall and said separating side of said separating device and/or a slope inclination.

3. The metering system of claim 1, wherein dependencies between the passage size of said passage opening determined by the slide position of said slide and the type of seed, the spreading quantity and/or the slope inclination are saved and/or stored in at least one memory of said on-board computer, in that said motorized actuating element can be actuated and/or is actuated by said onboard computer for adjusting the passage size of said passage opening at least in accordance with one of the dependencies.

4. The metering system of claim 1, wherein said separating device comprises at least one rotatably driven separating element with separating openings which are subjected to a pressure difference applied via a pneumatic pressure generating device and at which the seed grains to be separated and to be spread attach, where at least one wiper element arranged to be adjustable in the immediate vicinity of the separating openings is arranged to said separating element, wherein a motorized actuating element is associated with said adjustable wiper element, that said motorized actuating element is connected to said electronic on-board computer by way of a data transmission device, in particular a data line, in that data for adjusting said at least one wiper element is saved and/or stored in at least one memory of said on-board computer, and said motorized actuating element of said wiper element accordingly can be actuated or is actuated to adjust said wiper element.

5. The metering system of claim 1, wherein the data for adjusting the slide position of said slide element and for adjusting said wiper element are linked to one another, and that they can be actuated and/or are actuated in a corresponding manner at the appropriate point in time according to the saved and/or stored data by way of said respectively associated motorized adjustment elements of said slide element and said wiper element.

6. The metering system of claim 1, wherein said on-board computer comprises at least one input device, wherein, by way of said input device, the type of seed, the desired spreading quantity, in particular a number of seed grains to be spread per unit area or distance travelled, a respective average slop inclination, in particular an expected and/or actual slope inclination of a field to be cultivated, can be entered and/or is entered manually by way of said input device and/or by way of a sensor for determining the slope inclination and/or is transmitted via a data line.

7. The metering system of claim 1, wherein at least one sensor for determining the slope inclination is associated with said metering system, that said data of the slope inclination determined by said sensor for determining the slope inclination can be transmitted and/or is transmitted via a data line o said on-board computer, that said actuating elements of said slide element and/or said wiper element can be actuated and/or are actuated accordingly by said on-board computer ased on said transmitted data of said slope inclination.

8. The metering system of claim 1, wherein, when traveling transverse to the slope, when said seed passage opening in said partition wall of said separating device is disposed on the upslope side with respect to said separating device, so that said seed storage chamber is disposed on the upslope side with respect to said separating device, the passage size of said seed passage opening is adjusted by way of said on-board computer by appropriate actuation of said actuating element of said slide to be smaller than when said seed passage opening in said partition wall is disposed on the downslope side with respect to said separating device, so that said seed storage chamber is disposed on the downslope side with respect to said separating device.

9. The metering system of claim 1, wherein, when traveling transverse to the slope, when said seed passage opening in said partition wall of said separating device is disposed on the downslope side with respect to said separating device so that said seed storage chamber disposed on the downslope side with respect to said separating device, the passage size of said seed passage opening is adjusted by way of said on-board computer by appropriate actuation of said actuating element of said slide to be larger than when said seed passage opening in said partition wall is disposed on the upslope side with respect to said separating device, so that said seed storage chamber is disposed on the upslope side with respect to said separating device.

10. The metering system of claim 8, wherein the passage size of said passage opening in said partition wall is adjusted during a spreading travel on level ground by way of said on-board computer by appropriate actuation of said actuating element of said slide to an intermediate size compared to the settings when traveling transverse to the slope, when said passage opening in said partition wall is disposed on the downslope side with respect to said separating device so that said seed storage chamber is disposed on the downslope side, or when said passage opening is disposed on the upslope side with respect to said separating device so that said seed storage chamber is disposed on the upslope side.

11. The metering system of claim 1, wherein, when travelling downhill on a slope, the passage size of said passage opening in said partition wall is adjusted by way of said on-board computer by appropriate actuation of said actuating element of said slide to be smaller than when said agricultural machine is moving forward on an at least approximately horizontal surface, and that when travelling uphill on a slope, said passage size of said passage opening is adjusted by way of said on-board computer y appropriate actuation of said actuating element of said slide to be larger than when said agricultural machine is moving forward on an at least approximately horizontal surface.

12. The metering system according to of claim 1, wherein a sensor for determining a filling level of seed is arranged in the chamber between said partition wall and said separating side of said separating device, that said sensor transmits data regarding said filling level of seed to said onboard computer and said motorized actuating element for adjusting the passage size of said passage opening in said partition wall is actuated accordingly in accordance with said data.

13. The metering system of claim 1, wherein said agricultural machine is composed of at least two side frames, with metering systems arranged thereon, that can be folded at a central part each by at least approximately 90° about an axis each running in the direction of travel by way of a motorized folding system from a working position to a transport position, wherein devices for detecting the folding process and/or an initiation of the folding process are associated with said motorized folding system, wherein said devices send signals in the transport position to said motorized actuating element of said slide before or at the beginning of the folding process of said side frames with said metering systems arranged thereon, so that said respective slide is moved into a position closing said passage opening.

14. The metering system according to claim 13, wherein the devices for detecting the folding process and/or the initiation of the folding process are configured as angle sensors.

* * * * *